(12) United States Patent
Dechant et al.

(10) Patent No.: US 12,498,027 B2
(45) Date of Patent: Dec. 16, 2025

(54) DRIVE ARRANGEMENT

(71) Applicant: SCHLETTER INTERNATIONAL B.V., Amsterdam (NL)

(72) Inventors: Gabriel Dechant, Gstadt am Chiemsee (DE); Jan Zapfe, Grafing (DE)

(73) Assignee: SCHLETTER INTERNATIONAL B.V. (NL)

( * ) Notice: Subject to any disclaimer, the term of this patent is extended or adjusted under 35 U.S.C. 154(b) by 0 days.

(21) Appl. No.: 18/835,515

(22) PCT Filed: Jan. 31, 2023

(86) PCT No.: PCT/EP2023/052277
§ 371 (c)(1),
(2) Date: Aug. 2, 2024

(87) PCT Pub. No.: WO2023/148150
PCT Pub. Date: Aug. 10, 2023

(65) Prior Publication Data
US 2025/0137516 A1 May 1, 2025

(30) Foreign Application Priority Data
Feb. 3, 2022 (DE) ...................... 10 2022 102 608.6

(51) Int. Cl.
*F16H 27/02* (2006.01)
(52) U.S. Cl.
CPC .................................... *F16H 27/02* (2013.01)
(58) Field of Classification Search
CPC ........... H02S 20/32; F24S 50/20; F24S 50/00; F16H 27/02

USPC .............................................. 136/206; 74/89
See application file for complete search history.

(56) References Cited

U.S. PATENT DOCUMENTS

| | | | |
|---|---|---|---|
| 2,337,359 A | 12/1943 | Thompson | |
| 2008/0066985 A1 | 3/2008 | Cheng | |
| 2021/0058025 A1 | 2/2021 | Dechant | |

FOREIGN PATENT DOCUMENTS

| | | |
|---|---|---|
| DE | 328666 C | 11/1920 |
| DE | 516616 C | 1/1931 |
| GB | 766367 A | 1/1957 |

(Continued)

OTHER PUBLICATIONS

Search Report issued in International Application No. PCT/EP2023/052277.

*Primary Examiner* — T. Scott Fix
(74) *Attorney, Agent, or Firm* — The Belles Group, P.C.

(57) ABSTRACT

A drive arrangement for solar modules is disclosed. The drive arrangement comprises a transmission member rotatable about a rotational axis comprising a drive member and a holding member, wherein the drive member is disposed with an offset in the radial direction to the holding member, and an output unit, wherein the output unit comprises a drive recess and a retaining recess, wherein the drive member is assigned to the drive recess and engages with the drive recess to drive the output unit, wherein the holding member is assigned to the retaining recess and engages with the retaining recess to keep the output unit in its set position, wherein the drive recess has an entry opening, an end area, and a middle area that is between the entry opening and the end area, wherein the drive recess in the middle area compared to the end area has a reduced cross section.

16 Claims, 23 Drawing Sheets

(56) References Cited

FOREIGN PATENT DOCUMENTS

GB 1212814 A 11/1970
WO 2019179781 A1 9/2019

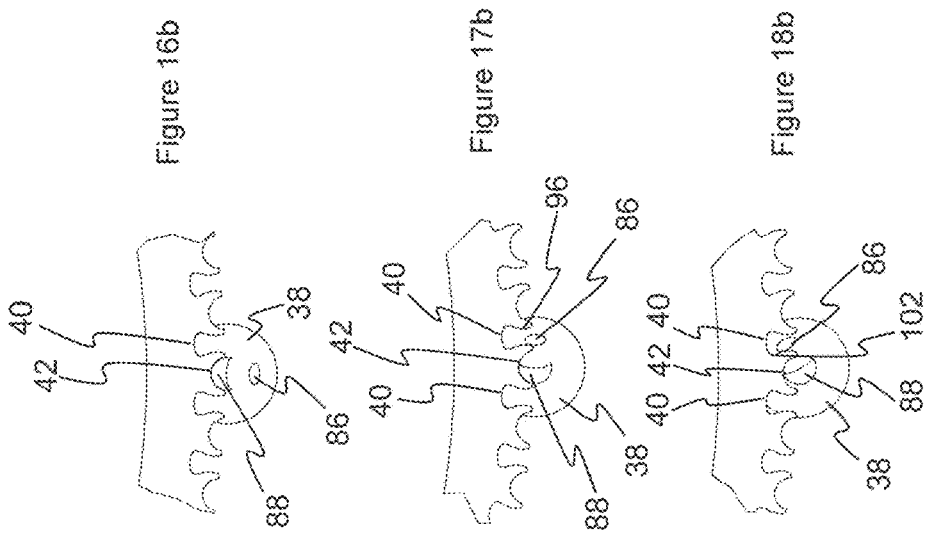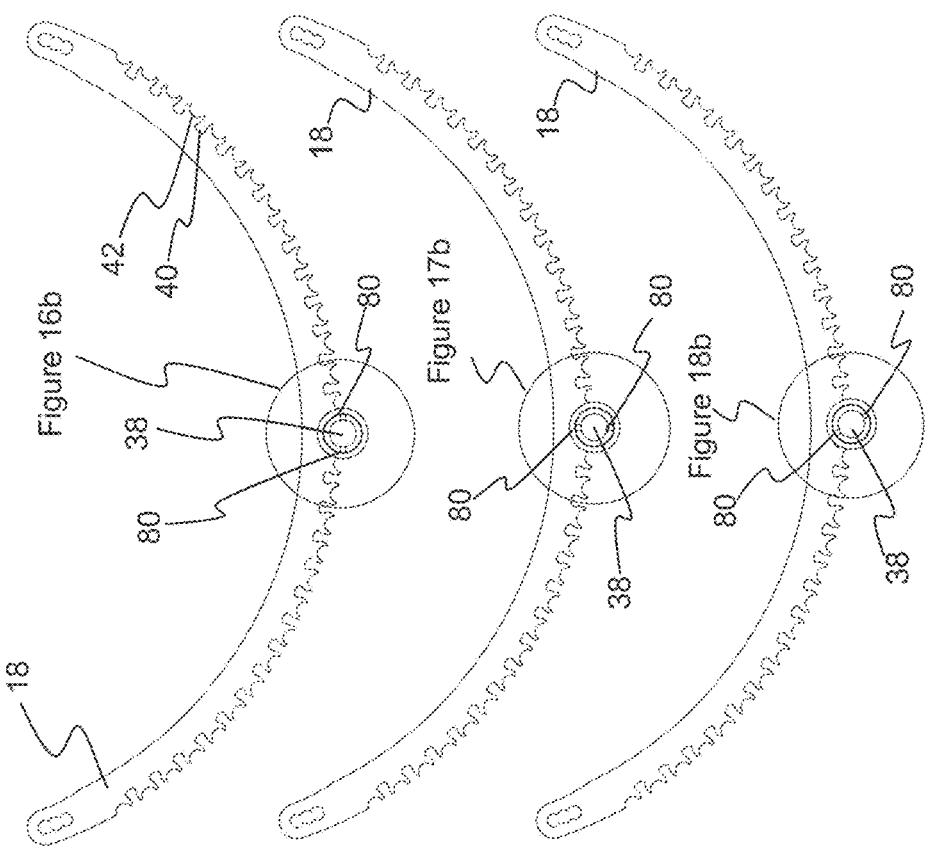

DRIVE ARRANGEMENT

CROSS-REFERENCE TO RELATED APPLICATIONS

The present application is a U.S. national stage application under 35 U.S.C. § 371 of PCT Application No. PCT/EP2023/052277 filed Jan. 31, 2023, which claims priority to German Patent Application No. 10 2022 102 608.6 filed Feb. 3, 2022, the entire disclosures of which are incorporated herein by reference.

The present invention relates to a drive arrangement to drive at least one output unit.

Such drive arrangements have a transmission member and an output unit. The transmission member is engaged with the output unit to transmit a torque or a force onto the output unit. Such drive arrangements are often referred to as Maltese cross mechanism or "Geneva drive".

It is an object of the present invention to provide an improved drive arrangement with which the function of the drive arrangement may be ensured in the long term, for example in case of reduced precision of the arrangement or in case of increased contamination.

This object is achieved with a drive arrangement having the features of claim 1.

Further embodiments are provided in the dependent claims.

The drive arrangement according to the invention used for driving at least one displaceable output unit comprises at least one transmission member rotatable about a rotational axis, which comprises at least a drive member and at least a holding member. The at least one drive member is disposed with an offset in the radial direction to the at least one holding member. Moreover, the drive arrangement comprises at least an output unit, wherein the output unit has at least a drive recess and at least a retaining recess. The at least one drive member is assigned to the at least one drive recess and engages with the at least one drive recess to drive the output unit. The at least one holding member is assigned to the at least one retaining recess and engages with the at least one retaining recess to keep the output unit in its set position. The at least one drive recess has an entry opening, an end area and a middle area that is configured between the entry opening and the end area, wherein the at least one drive recess in the middle area has, compared to the end area, a reduced cross section.

The at least one transmission member and the output unit are configured such that the function of the drive arrangement may be guaranteed continuously. In particular, the force-transmitting or torque-transmitting engagement between the at least one drive recess and the at least one drive member may even be ensured if the distance between the at least one transmission member and the at least one output unit is increased due to manufacturing tolerances, assembly tolerances and/or elastic deformations of the at least one transmission member and/or the at least one output unit.

The cross section of the at least one drive recess may be larger at the entry opening than at the middle area of the at least one drive recess. The at least one drive recess may have opposing wall portions. The opposing wall portions may have a curvature. Due to their the curvature the opposing wall portions may reduce the cross section of the at least one drive recess in the middle area.

The opposing wall portions may each have an apex. The opposing wall portions may have the smallest distance to each other at the apexes. Starting from the entry opening, the distance between the opposing wall portions may reduce up to the apexes. Starting from the apexes, the distance between the opposing wall portions may increase in the direction of the end area of the at least one drive recess. The end area of the at least one drive recess may comprise a bottom of the drive recess or may be formed by a bottom of the drive recess.

The at least one drive recess configured such that contributes to achieving a larger permissible clearance between the output unit and the at least one transmission member to be able to compensate for assembly tolerances and manufacturing tolerances. Due to the at least one drive recess or due its form described above, a relative movement between the output unit and the at least one transmission member may be blocked longer by the at least one drive member, so that a premature release of the output unit due to a movement of the output unit may be prevented under strain. Thus, unwanted movements of the drive unit can be prevented reliably.

The at least one drive member may have a longitudinal axis. The at least one drive member may have a cross section that is curved at least in sections deviating from a circular cross section. The longitudinal axis may extend at least substantially parallel to the rotational axis of the at least one transmission member. The cross section of the at least one drive member may have a radial distance to the rotational axis. Thus, the rotational axis may be located in the radial direction outside of the cross section of the at least one drive member.

Due to the engagement of the at least one drive member into the at least one drive recess, the at least one transmission member and the output unit are coupled in such a force-transmitting or torque-transmitting manner that performing a rotational movement of the at least one transmission member leads to a gradual adjustment movement of the output unit. A continuous rotational movement of the at least one transmission member about the rotational axis correspondingly leads to a gradual adjustment movement of the output unit. The adjustment movement of the output unit is always carried out if the at least one drive member is in engagement with the at least one drive recess. If a rotational movement of the at least one transmission member is carried out, the at least one drive member may engage into the associated drive recess of the output unit, may move the output unit and subsequently leave the drive recess again. Between the engagement of the drive member into the drive recess and the exit of the drive recess, the at least one drive member presses against a wall of the drive recess, causing a force or a torque on the output unit, which leads to an adjustment movement of the output unit by one step.

The at least one holding member always engages into the at least one retaining recess of the output unit if the at least one drive member is not in engagement with the at least one drive recess of the output unit. The at least one holding member may engage into the at least one retaining recess in a form-fitting manner. In this state, the output unit may be maintained in its set position. Thus, the drive arrangement is in a blocked position. The output unit cannot move in the blocked position. Due to the rotational movement of the at least one transmission member with the at least one holding member, the at least one holding member initially engages with a portion into the at least one associated retaining recess of the output unit, wherein that portion continuously extends until it reaches a maximum superimposition due to the rotational movement of the at least one transmission member before the superimposition starts to decrease again if the rotational movement of the at least one transmission member continues in the same rotational direction. After executing a predetermined rotational angle, the holding member may leave the at least one retaining recess again. As soon as the at least one holding member engages into the retaining recess, even if only partially, a movement of the output unit may be prevented.

If the at least one transmission member is powered further, the holding member and the drive member continue to turn or turn backwards so that the drive member may be engaged with the next drive recess. The drive member may, for example, be rotated about the rotational axis of the at least one transmission member after exiting a drive recess to be engaged with the next drive recess. At the same time, the at least one holding member continues to turn in the retaining recess and leaves the retaining recess if or shortly after the drive member engages with the next drive recess. The at least one holding member thus releases the output unit for the next adjustment step.

The at least one drive member may have a cross section with at least a curved portion that contacts a wall of the at least one drive recess for driving the at least one output unit. The at least one drive member, with respect to the rotational axis of the at least one transmission member, may have a cross section that is reduced in the radial direction.

The cross section of the at least one drive member may at least have one first apex and at least one second apex. The distance between the first apex and the second apex may determine the largest extension of the drive member. The cross section of the at least one drive member may have its largest extension in a direction transverse to the radial direction of the at least one transmission member. Alternatively, the cross section of the at least one drive member may have at least one first edge and one second edge, wherein their distance from each other defines the largest extension of the drive member. If two edges are provided at the cross section of the drive member, the cross section of the drive member may have two curved portions extending between the two edges. If the cross section of the drive member has two apexes, the cross section is curved in the area of the apexes as well. Thus, the cross section of the drive members may have several curvature radii. The curvature radius in the area of the apexes may differ from the curvature radius of the portion between the two apexes.

Through the cross section of the drive recesses described above, the at least one drive member may have a larger or broader configuration in the tangential direction, meaning that the distance between the first apex and the second apex of the drive member may be correspondingly larger. Accordingly, the at least one drive member may absorb greater forces and may be sturdier overall.

The cross section of the at least one drive member may at least have one third apex and at least one fourth apex. The distance between the third apex and the fourth apex may be smaller than the distance between the first apex or the first edge and the second apex or the second edge. The third apex and the fourth apex may be in alignment in radial direction of the at least one transmission member. The distance between the first apex and the second apex may be matched to the size of the drive recess. As a result of the cross section of the drive member being reduced in the radial direction, in particular the drive recesses with a minimized cross section at the entry opening may be configured, since due to its form, the at least one drive member only needs little space to dip into the corresponding drive recess.

As a result of the distance between the third apex and the fourth apex, which is smaller than the distance between the first apex and the second apex, the shifts between the at least one transmission member and the output unit, which may be created due to tolerances, may be compensated or limited, so that the engagement of the at least one drive member into the associated drive recess may be ensured. Based on the distance between the third and the fourth apex, among other things, meaning based on the cross section of the drive member reduced in the radial direction, the size of the radial free space between the at least one holding member and the at least one drive member that may supports the alternating engagement of the drive member and the holding member into the respective associated drive recess and retaining recess, may be determined.

The at least one drive recess may expand outwardly or inwardly in the direction of its entry opening. Due to the outwardly expansion of the drive recess, the entry opening of the drive recess may be expanded for dipping or engaging of the drive member. The distance between two opposing wall portions of the at least one drive recess may expand in the direction of the entry opening.

The rotational axis of the at least one transmission member may run through or along the at least one holding member. The at least one holding member may have a curved outer contour. The curvature of the outer contour of the holding member is adjusted to the curvature of the at least one retaining recess, so that the at least one holding member may enter the at least one retaining recess and may rotate inside the retaining recess. As soon as the at least one holding member enters the at least one retaining recess, a movement of the output unit may be blocked. The curvature radius of the curved outer contour may be adjusted to the curvature radius of the wall of the at least one retaining recess.

The at least one holding member may have a curved surface that faces the at least one drive member. The curved surface may be curved concavely.

The at least one drive member and the at least one holding member may be connected to each other via at least one abutment element. The abutment element may extend in the radial direction. The abutment element may, for example, be disc-shaped or cam-shaped. The at least one abutment element may further be connected to at least one coupling portion via which the at least one transmission member may be coupled with at least one drive shaft. The drive may be coupled directly or indirectly via other components.

The at least one drive member and the at least one holding member may extend parallel to the rotational axis of the at least one transmission member. The drive recesses and the retaining recesses may be configured correspondingly to the shape or the cross section of the drive member and the holding member. The at least one drive member may have an oval or an elliptical or a lenticular or a circular cross section. The at least one holding member may have a cross section that is shaped like a segment of a circle or that is crescent-shaped.

The at least one output unit may be a unit that is rotatable or pivotable about an axis. The drive recesses and the retaining recesses may be configured at the inner circumference of the output unit that is rotatable or pivotable about an axis.

The at least one output unit may be a linear displaceable unit. The drive recesses and retaining recesses of the linear displaceable output unit may be disposed along the axis of movement. The linear displaceable output unit may be a gear rack.

In the following, example embodiments of the present invention are described with reference to the accompanying figures. In the drawings:

FIGS. 16a to 18a are views of the drive arch and the transmission member in different positions;

Figure 1:
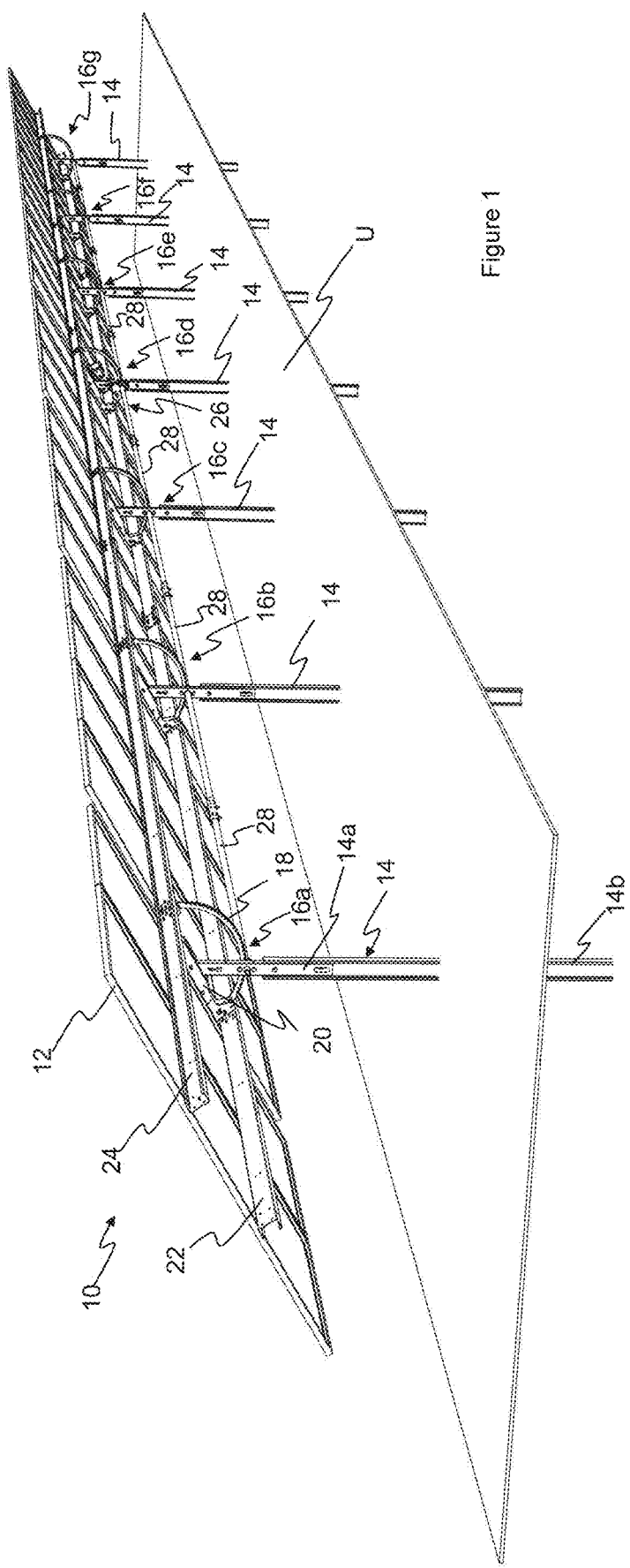
FIG. 1 is a perspective view of a tracking device.

FIG. 1 shows a perspective view of a tracking device 10 for solar modules 12. The tracking device 10 tracks the position of the sun with the solar modules 12. The tracking device 10 comprises several posts 14 and several pivoting units 16a to 16g. The tracking device 10 or the pivoting units 16a to 16g are anchored to the underground U via the posts 14. The posts 14 comprise two portions. The posts 14 comprise a fastening portion 14a and an anchoring portion 14b. The anchoring portion 14b is anchored to the underground U. Subsequently, the fastening portion 14a may be attached to the anchoring portion 14b with one of the pivoting units 16a to 16g.

Each of the pivoting units 16 comprises a drive arch 18 and a cross member 20. The drive arch 18 may represent an output unit. For reasons of clarity, only the post portions 14a, 14b, the drive arch 18 and the cross member 20 of the front pivoting unit 16a shown in FIG. 1 have a reference sign. The pivoting units 16a to 16g are connected with each other via support rails 22 to 24. The support rails 22 to 24 are attached to the cross members 20. The support rails 22 to 24 carry the solar modules 12 fastened to the support rails 22 to 24. The tracking device 10 is configured especially for arranging the solar modules 12 in the portrait orientation. In the portrait orientation, the solar modules 12 are arranged vertically or in portrait format.

The tracking device 10 comprises a drive unit 26. The drive unit 26 is disposed at the post 14 of the pivoting unit 16d and powers the pivoting units 16a to 16g via the drive shafts or the drive shaft pieces 28. The drive shafts 28 couple the pivoting units 16a to 16g with each other in a torque-transmitting manner. The torque created by the drive unit 26 disposed at the pivoting unit 16d may be transmitted to the remaining pivoting units 16a to 16c and 16e to 16g via the drive shafts 28.

Figure 2:
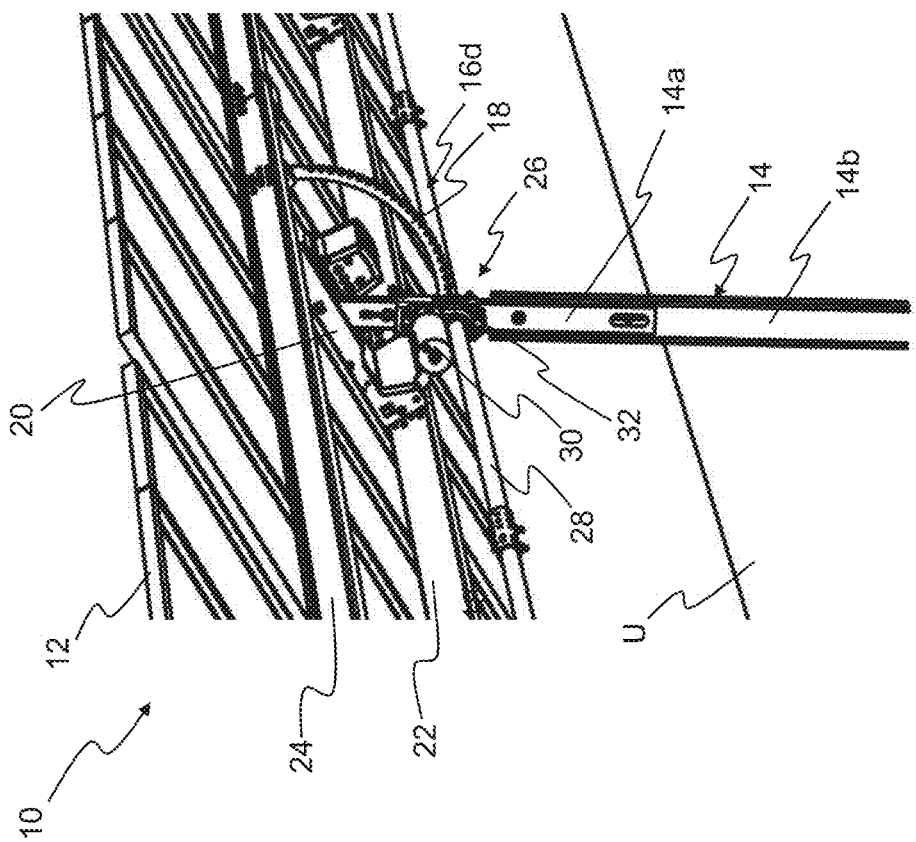
FIG. 2 is an enlarged view of the section in FIG. 1.

FIG. 2 shows an enlarged view of the section in FIG. 1, in which especially the pivoting unit 16d and the drive unit 26 are shown. The drive unit 26 is disposed at a post 14. The post 14 comprises two portions. The post 14 is composed of the fastening portion 14a and an anchoring portion 14b that is anchored to the underground U. The drive unit 26 and the pivoting unit 16d are attached to the fastening portion 14a that comprises the drive arch 18 and the cross member 20. The drive unit 26 comprises a motor 30 and a gearbox 32.

Figure 3:
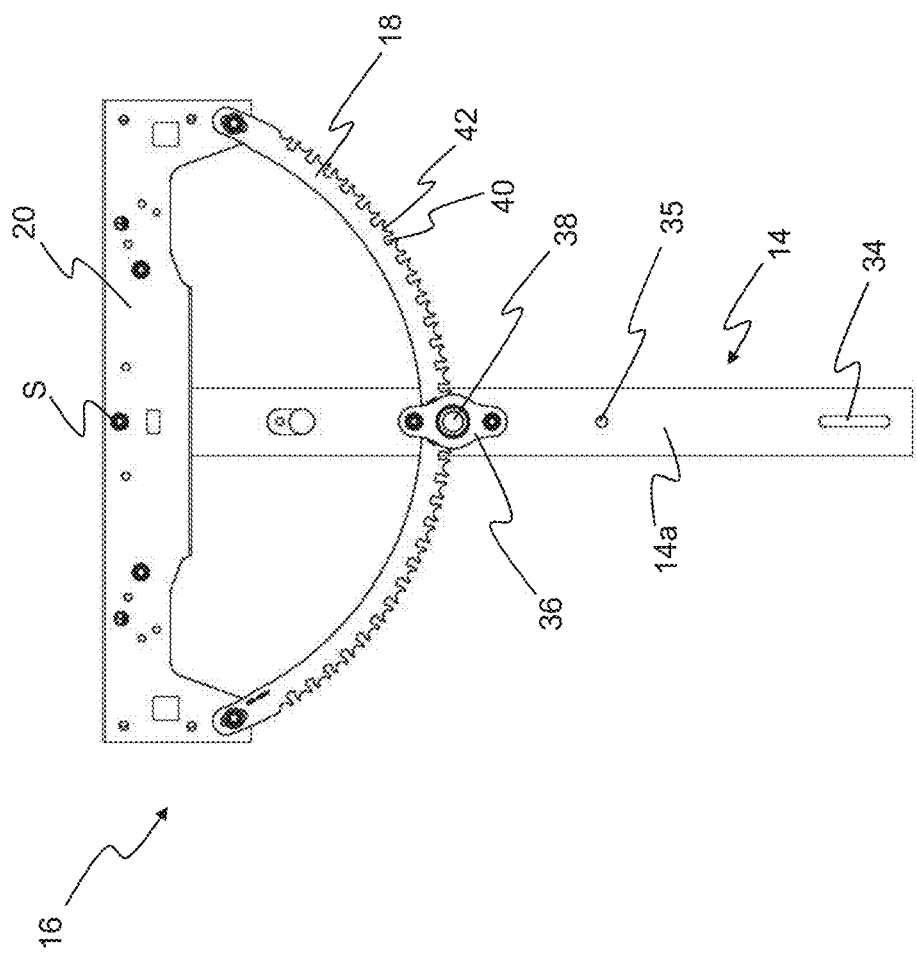
FIGS. 3 to 6 are different views of a pivoting unit for the tracking device according to FIG. 1.

FIG. 3 shows a view of a pivoting unit 16. The pivoting unit 16 is attached to the post 14 in such a way that it may be pivotable about the pivot axis S. The pivoting unit 16 comprises the drive arch 18 and the cross member 20. The drive arch 18 is fastened to the cross member 20. The cross member 20 is pivotably attached to the post 14. FIG. 3 shows the fastening portion 14a of post 14. The fastening portion 14a has an elongated hole 34 and an opening 35 that are used to connect the anchoring portion 14b shown in FIGS. 1 and 2. The opening 35 is provided above the elongated hole 34. The pivoting unit 16 and a bearing member 36 are attached to the fastening portion 14a. The bearing member 36 supports a transmission member 38, wherein only its front end is visible in FIG. 3. The transmission member 38 transmits a torque to the drive arch 18 to pivot the pivoting unit 16. Moreover, the transmission member 38 also serves for locking the drive arch 18 in a set position.

The drive arch 18 is fastened to the cross member 20. Regarding the pivot axis S, the drive arch 18 has several recesses 40 and 42 on its radial outer side. The recesses 40 are drive recesses 40 with which the drive arch 18 may be moved and thus the pivoting unit 16 may be pivoted. The retaining recesses 42 serve for holding or locking the drive arch 18 and thus the pivoting unit 16 in the set position.

Figure 4:
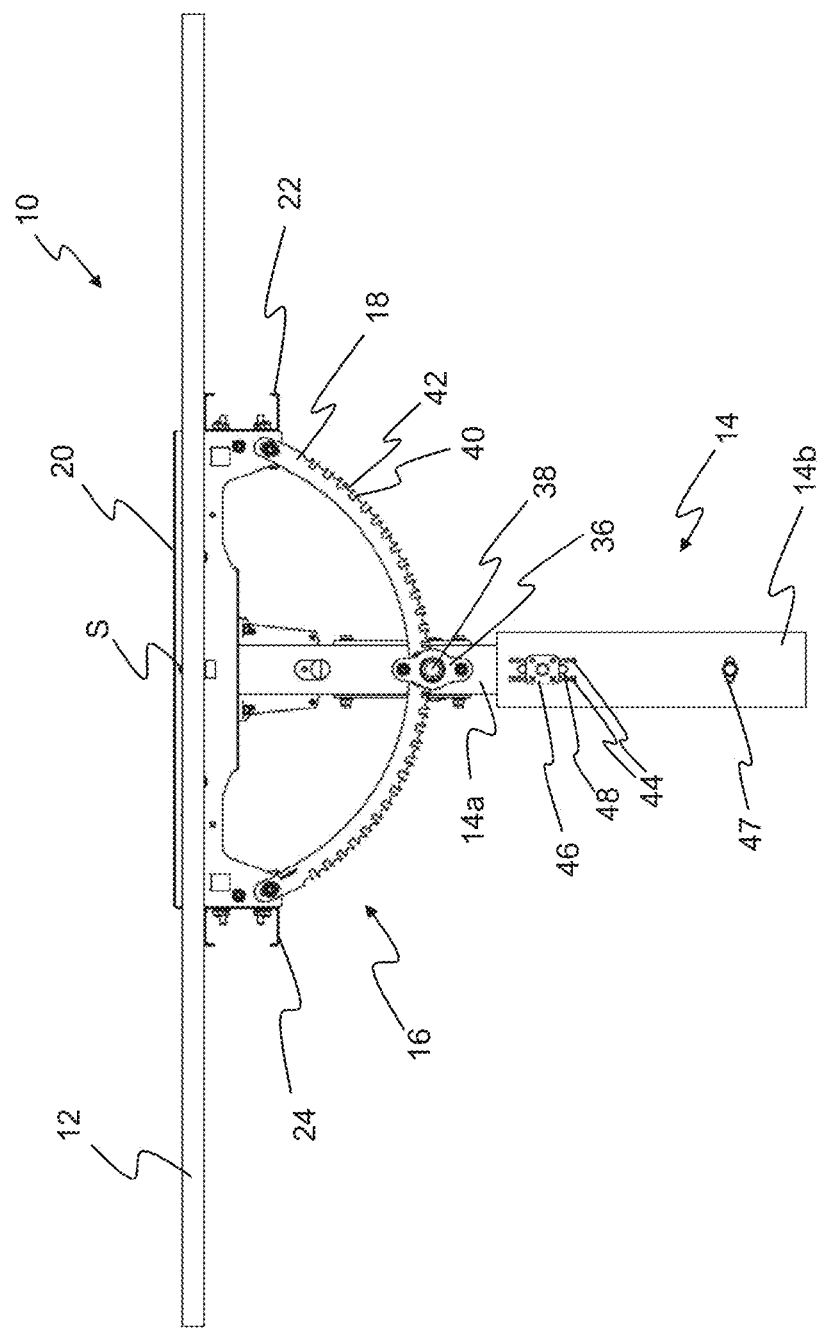

FIG. 4 shows a further view of the tracking device 10. The support rails 22 and 24 are fastened to the cross member 20 via screwed connections. The support rails 22 and 24 carry the solar modules 12. The cross member 20 protrudes the upper edge of the solar module 12 in the vertical direction. This means that the cross member 20 and thus the pivoting unit 16 are disposed in the direction of the pivot axis S between two adjacent solar modules 12. The pivoting units 16 are configured in such a way that the center of gravity of the arrangement coincides with the pivot axis S or the associated location of a pivot.

The fastening portion 14a and the anchoring portion 14b of the post 14 are connected with each other. The anchoring portion 14b has two rows of holes 44, a retaining clip 46, an opening 47 and an elongated hole 48. The elongated hole 48 is located between the two rows of holes 44. Together with a retaining clip 46, the rows of holes 44 retain the adjusted height of the fastening portion 14a. The opening 47 is provided below the rows of holes 44 and the elongated hole 48 at the anchoring portion 14b. The opening 47 is caterpillar-shaped in the embodiment shown. The elongated hole 34 and the opening 35 at the fastening portion 14a (see FIG. 3) interact with the elongated hole 48 and the opening 47 at the anchoring portion 14b to adjust the height and angle of the fastening portion 14a. The set height of the fastening portion 14b may be set or retained via the retaining clip 46 that engages with the two rows of holes 44 at the anchoring portion 14b. The angle between the fastening portions 14a and 14b may be adjusted via the caterpillar-shaped opening 47.

Figure 5:
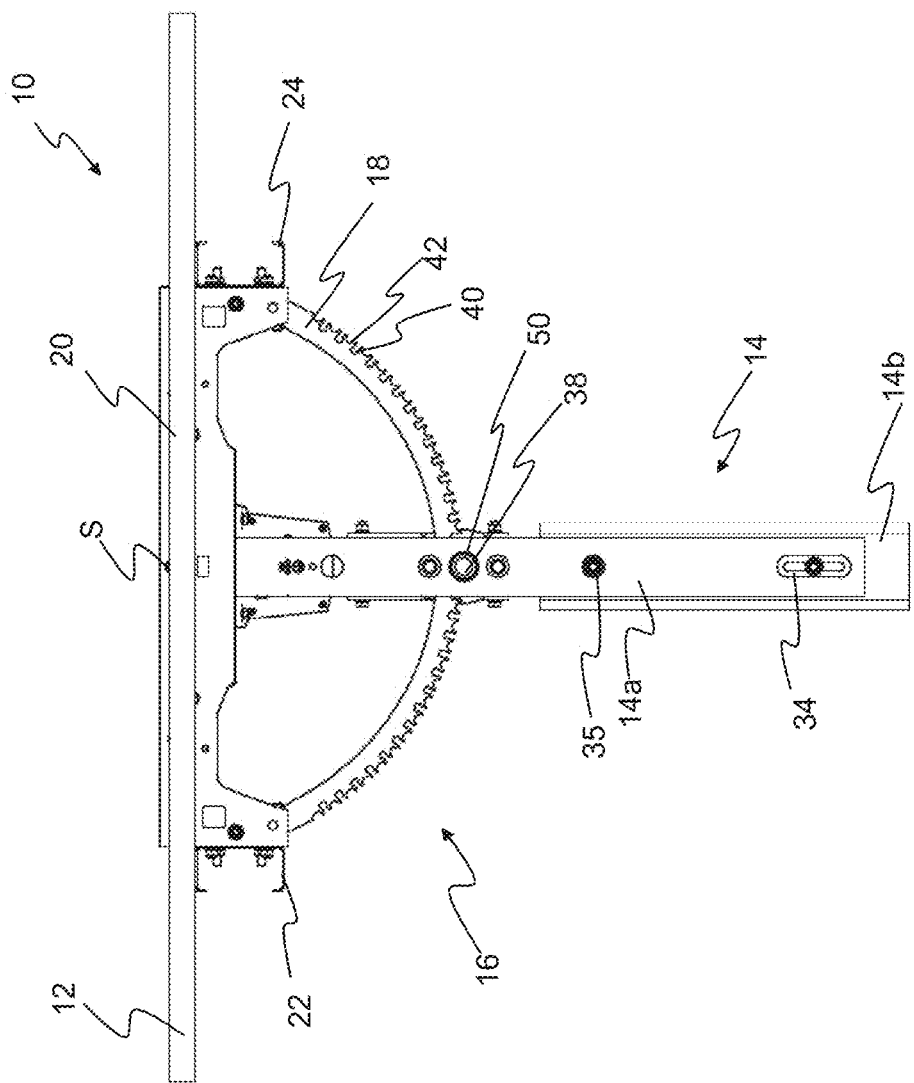

FIG. 5 shows a view of the tracking apparatus 10 that shows, compared to FIGS. 3 and 4, the other axial side of the post 14 and the pivoting device 16. FIG. 5 shows the fastening portion 14a. The fastening portion 14a comprises the elongated hole 34 and the opening 35 mentioned above. The fastening portion 14a is connected to the elongated hole 34 and the opening 35 via fastening members with the anchoring portion 14b. The fastening portion 14a has an opening 50 through which the transmission member 38 extends.

Figure 6:
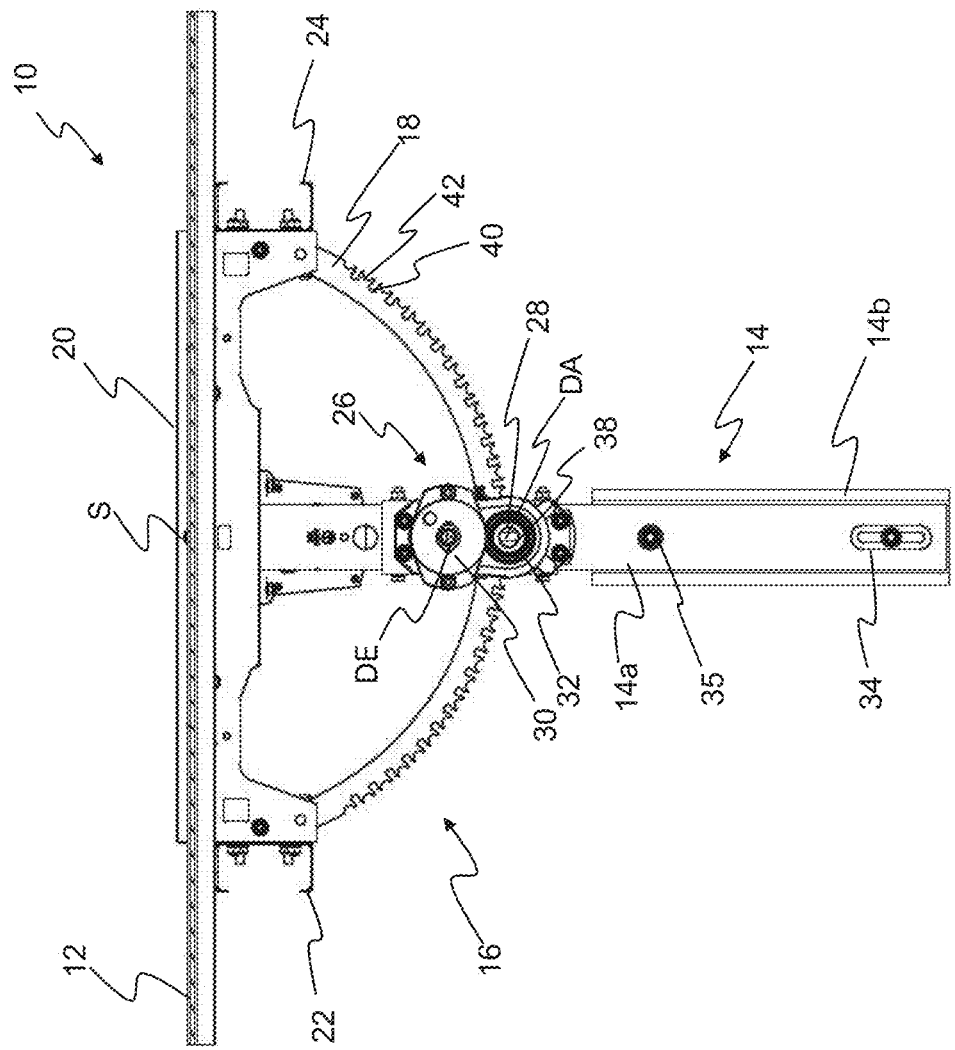

FIG. 6 shows a further view of the tracking device 10. FIG. 6 shows the same side of the tracking device 10 as FIG. 5. The drive unit 26 is disposed at the fastening portion 14a that comprises the motor 30 and the gearbox 32. The drive shaft 28 is coupled with the drive unit 26. The drive shaft 28 extends through the drive unit 26. The drive shaft 28 specifically extends through the gearbox 32 of the drive unit 26. The rotational axis DA of a source member (not shown) that coincides with the rotational axis of the drive shaft 28 substantially extends parallel to the pivot axis S. The rotational axis DE of the motor 30 substantially extends parallel to the pivot axis S as well. Correspondingly, the rotational axis DA of the source member and the drive shaft 28 substantially extends parallel to the rotational axis DE of the motor 30.

Figure 7:
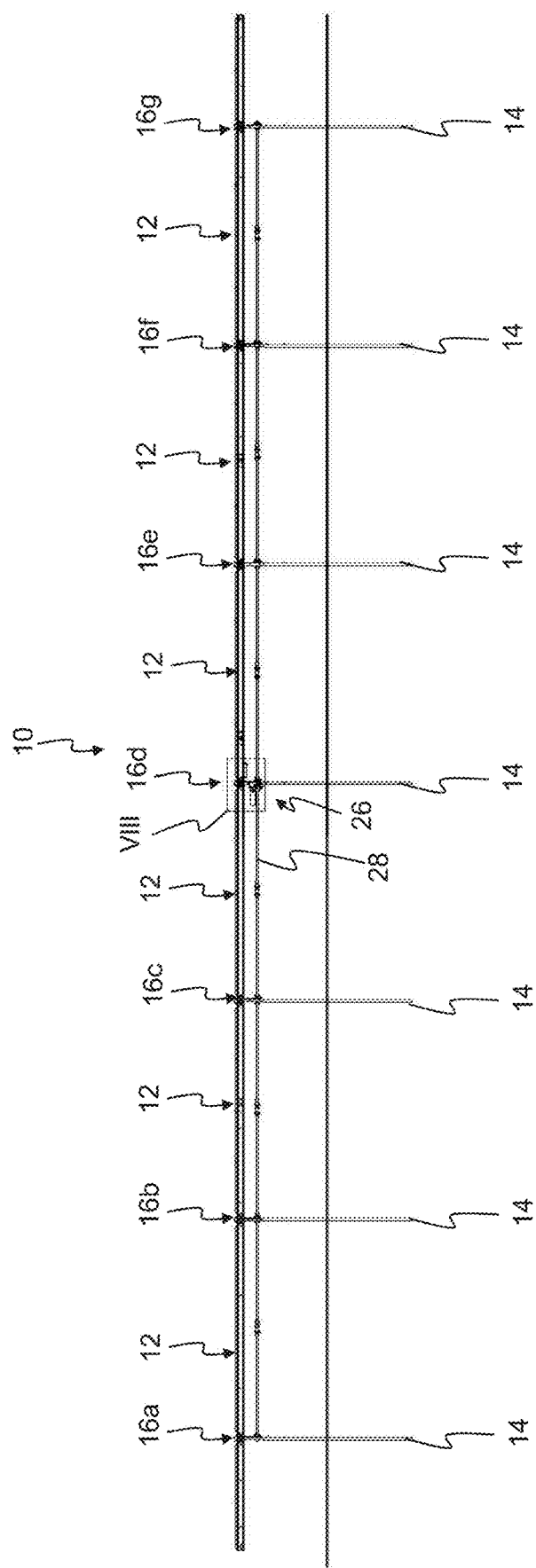
FIG. 7 is a view of the tracking device according to FIG. 1.

FIG. 7 shows a view of the tracking apparatus 10. The pivoting units 16a to 16g are disposed in the axial direction in the space between the solar modules 12. Due to this arrangement of the pivoting units 16a to 16g, in which the posts 14 are disposed between the solar modules 12, the center of gravity coincides with the pivot axis or the associated location of a pivot. The pivoting units 16a to 16g are connected with each other via drive shafts 28 to power the individual pivoting units 16a to 16g and to be able to pivot the solar modules 12 about the pivot axis S (see FIGS. 3 to 6). According to this embodiment, the drive unit 26 is disposed at the central pivoting unit 16d or post 14 shown in FIG. 7, to which the pivoting unit 16d is attached.

Figure 8:
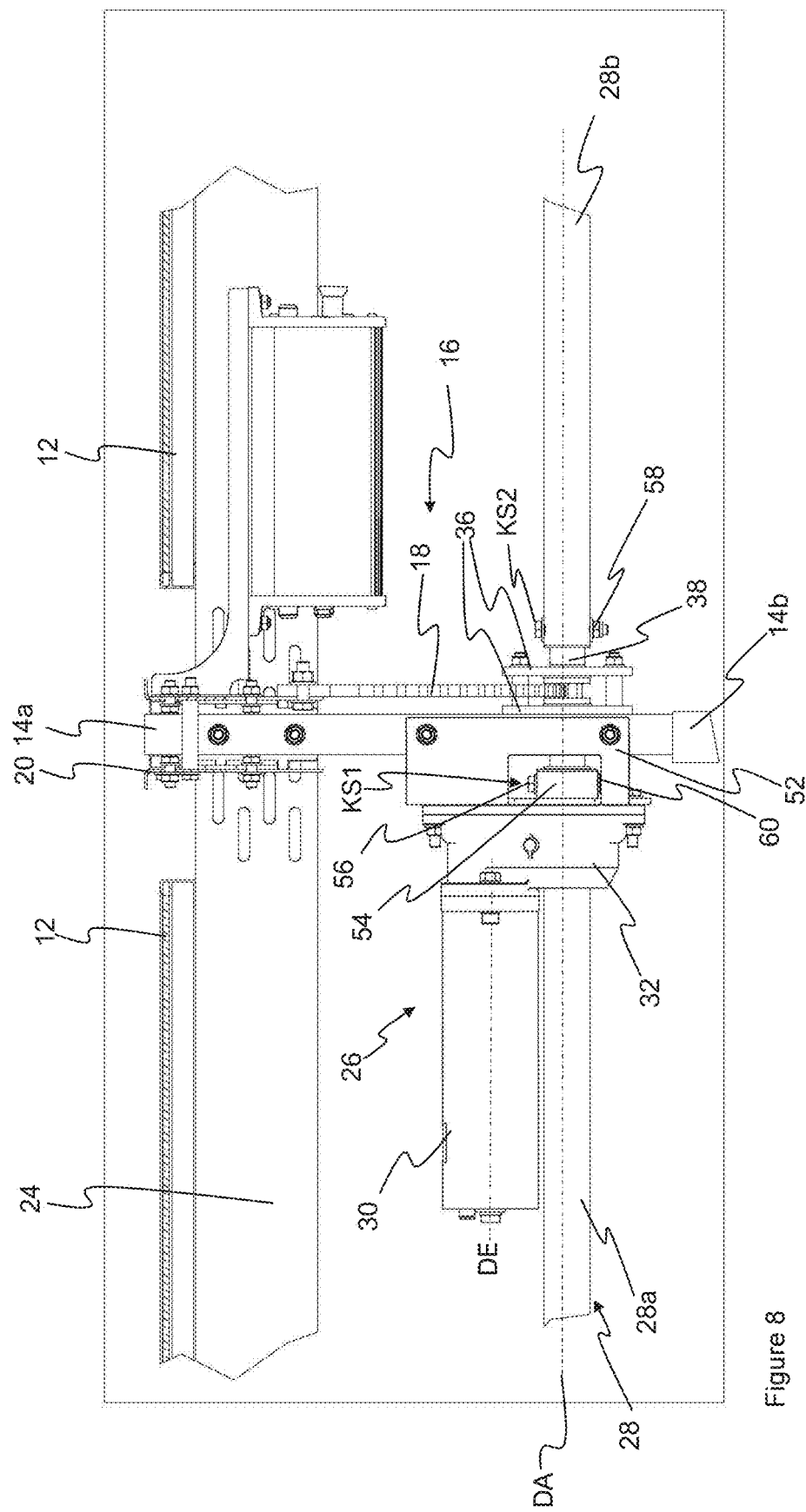
FIG. 8 is an enlarged view of section VIII in FIG. 7.

FIG. 8 shows an enlarged view of section VIII in FIG. 7. The drive shaft 28 is composed of several drive shaft pieces 28a and 28b. The drive shaft pieces 28a and 28b are coupled with each other in a torque-transmitting manner via the transmission member 38 in the area of the pivoting unit 16.

The transmission member 38 is configured to power the drive arch 18 so that it pivots the pivoting unit 16 and to secure the drive arch 18 in a position that has been set once to maintain the pivoting unit 16 in this position. The transmission member 38 is engaged with the drive arch 18 for this purpose. The main function of the transmission member 38 is powering and locking the drive arch 18. Apart from this main function, the transmission member 38 provides coupling of the drive shaft pieces 28a and 28b in a torque-transmitting manner. The transmission member 28 is rotatably mounted at the two bearing members 36. The two bearing members 36 are fastened at the fastening portion 14a.

A mounting member 52 for the drive unit 26 is laterally attached to the fastening portion 14a. The motor 30 and the gearbox 32 are fastened to the mounting member 52. In the axial direction, the gearbox 32 is disposed between the mounting member 52 and the motor 30. The motor 30 is located in the vertical direction above the drive shaft piece 28a. The rotational axis DE of the motor 30 extends at least substantially parallel to the rotational axis DA of the drive shaft 28, a source member 54 of the drive unit 26 and the transmission member 38. In other words, the rotational axes of the drive shaft 28, the source member 54 and the transmission member 38 coincide in the rotational axis DA.

The drive shaft 28 or the drive shaft piece 28a, the source member 54 and the transmission member 38 are connected with each other at a single joint axial coupling point KS1. According to this embodiment, the drive shaft 28, the source member 54 and the transmission member 38 are connected at the coupling point KS1 via a single coupling member 56, meaning via a single bolt 56. The holding member 52 has an opening 60 via which the coupling point KS1 is accessible.

The drive unit 26 is disposed at an axial side of the post 14 and is attached via the mounting member 52. The drive arch 18 and the bearing members 36 are disposed on the other axial side of the post 14. Thus, the post 14 is disposed in axial direction between the drive unit 26 and the drive arch 18.

The transmission member 38 is coupled with the drive shaft piece 28b at the coupling point KS2. The drive shaft piece 28b and the transmission member 38 are coupled via a single coupling member 58, meaning via a single bolt 58.

Figure 9:
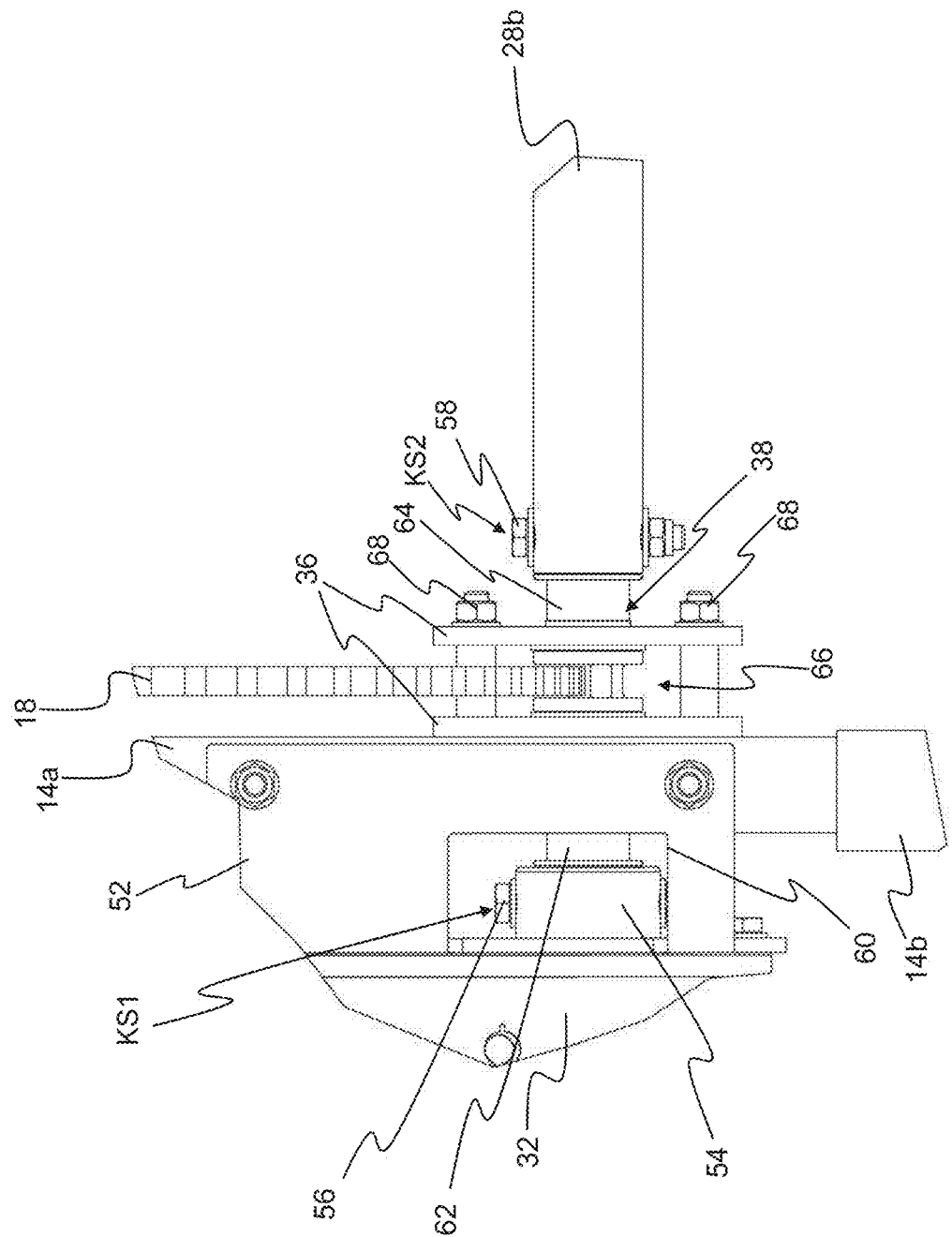
FIG. 9 is an enlarged view of the section in FIG. 8.

FIG. 9 shows an enlarged view of the section in FIG. 8. The transmission member 38 has two coupling portions 62 and 64. The engagement portion 66, via which the transmission member 38 is in engagement with the drive arch 18, is disposed between the coupling portions 62 and 64. The transmission member 38 is rotatably mounted at the two bearing members 36. The bearing members 36 are secured to the fastening portion 14a via bolts 68. The drive arch 18 extends in axial direction between the two bearing members 36. The coupling portion 64 of the transmission member 38 and the drive shaft piece 28b are coupled at the axial coupling point KS2 via the bolt 58 in a torque-transmitting manner.

Figure 10:
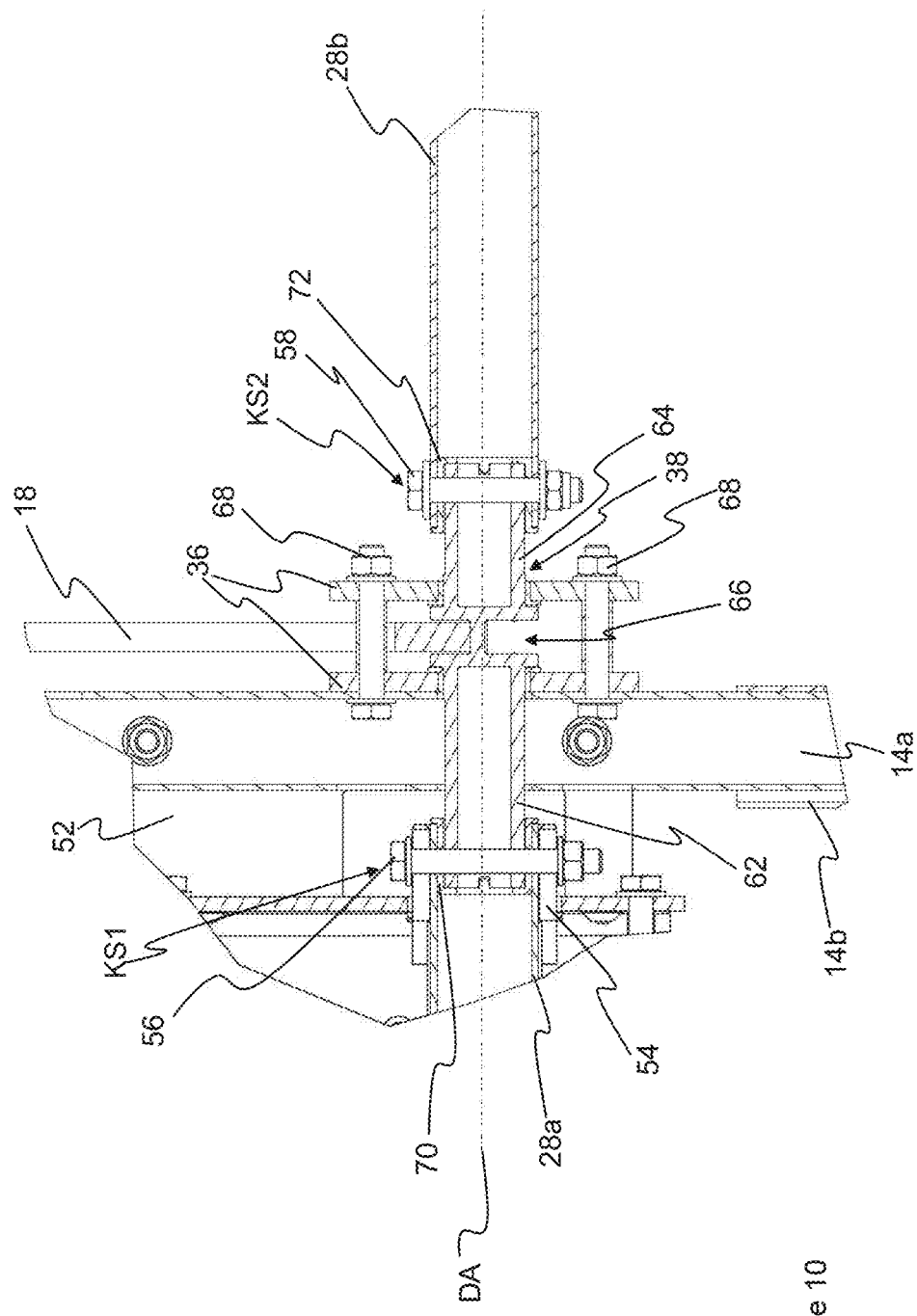
FIG. 10 is a sectional view of the enlarged section according to FIG. 9

FIG. 10 shows the section in accordance with FIG. 9 in section. The transmission member 38 comprises the two tubular coupling portion 62 and 64. The engagement portion 66, via which the transmission member 38 is in engagement with the drive arch 18, is disposed between the tubular coupling portions 62 and 64 in axial direction. The tubular coupling portion 62 of the transmission member 38 extends through the post 14 in the axial direction to the coupling point KS1. The transmission member 38 is rotatably mounted at the two bearing members 36. The bearing members 36 are secured to the fastening portion 14a via bolts 68. The drive arch 18 extends in axial direction between the two bearing members 36.

The drive shaft piece 28a, the transmission member 38 and the source member 54 are coupled with each other via the bolt 56 at the coupling point KS1 in a torque-transmitting manner. The bolt 56 extends perpendicular to the rotational axis DA through the drive shaft piece 28, the source member 54 and the tubular coupling portion 62 of the transmission member 38. The drive shaft piece 28a, the source member 54 and the tubular coupling portion 62 of the transmission member 38 are at least disposed inside the other in sections, so that their end portions overlap in the axial direction.

An elastic element 70 in the form of a sleeve is disposed in the radial direction between the coupling portion 62 and the drive shaft piece 28a. The sleeve 70 encloses the end portion of the coupling portion 62 and is supported via a radial outwardly protruding collar at the front end of the drive shaft piece 28a. Moreover, the sleeve 70 has a radial inwardly protruding collar at its respective other axial end, with which sleeve 70 may be supported at the front end of the coupling portion 62. The sleeve 70 compensates angular misalignments between the drive shaft piece 28a and the transmission member 38.

The tubular coupling portion 64 and the drive shaft piece 28b are coupled via the bolt 58 in a torque-transmitting manner at the coupling point KS2. The bolt 58 extends perpendicular to the rotational axis DA through the coupling portion 64 and the drive shaft piece 28b. An elastic element 72 in the form of a sleeve is disposed in the radial direction between the tubular coupling portion 62 and the drive shaft piece 28b. The sleeve 72 is configured identically to the sleeve 70 described above. Accordingly, the sleeve 72 encloses the end portion of the coupling portion 64 and is supported via a radial outwardly protruding collar at the front end of the drive shaft piece 28b. Moreover, the sleeve 72 has a radial inwardly protruding collar at its respective other axial end, with which sleeve 72 may be supported at the front end of the coupling portion 64. The sleeve 72 compensates angular misalignments between the transmission member 38 and the drive shaft piece 28*b*.

Figure 11:
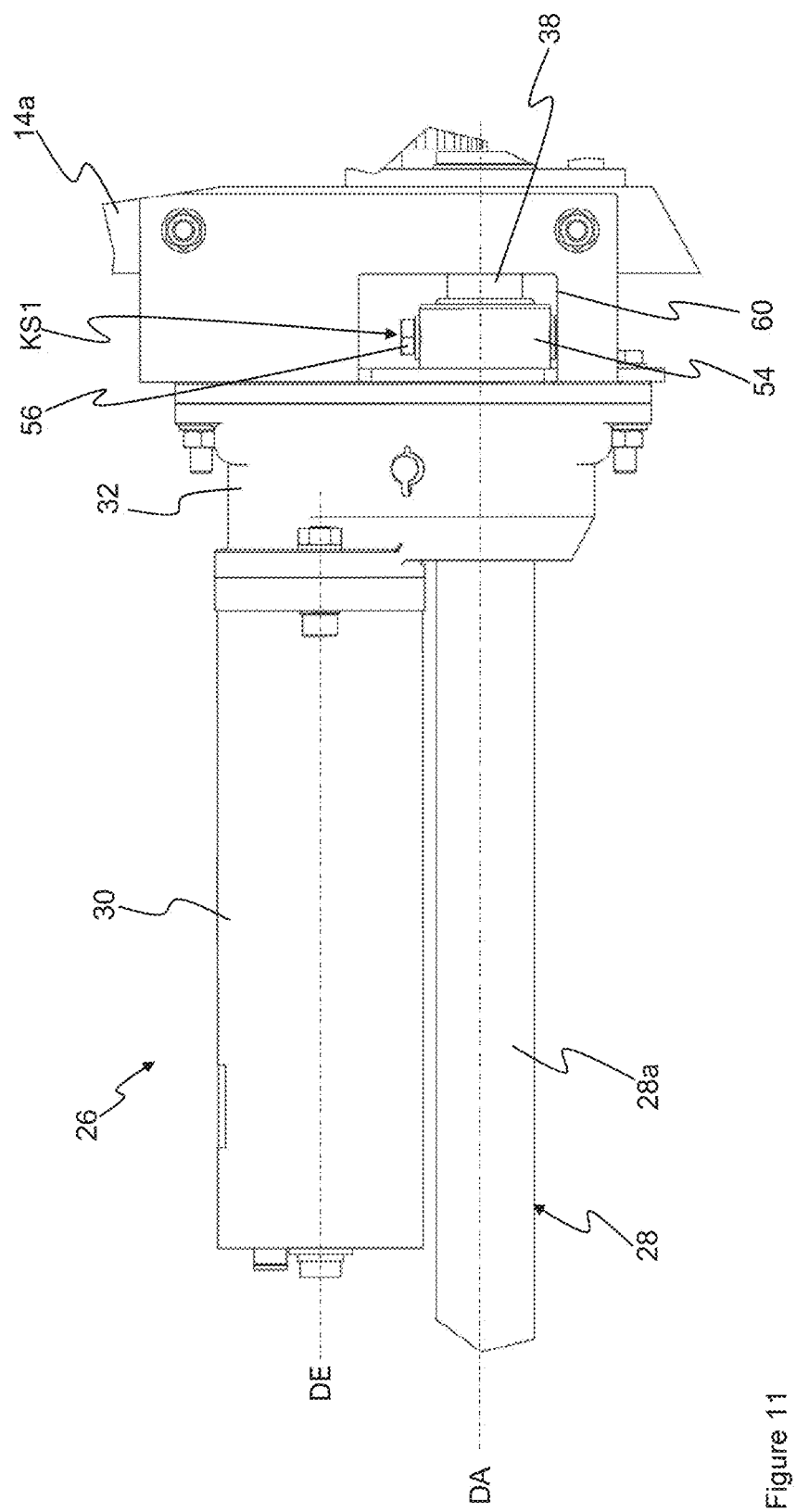
FIG. 11 is a view of an enlarged section in FIG. 8.

FIG. 11 shows an additional enlarged view of the section in FIG. 8. FIG. 11 shows the drive unit 26, which comprises the motor 30 and the gearbox 32. The drive unit 26 is coupled with the drive shaft 28 or the drive shaft piece 28*a* at the coupling point KS1 via the source member 54 and the bolt 56. The rotational axis DE of the motor 30 and the rotational axis DA, in which the rotational axis of the drive shaft piece 28*a*, the rotational axis of the source member 54 and the rotational axis of the transmission member 38 coincide, extend at least substantially parallel to each other.

Figure 12:
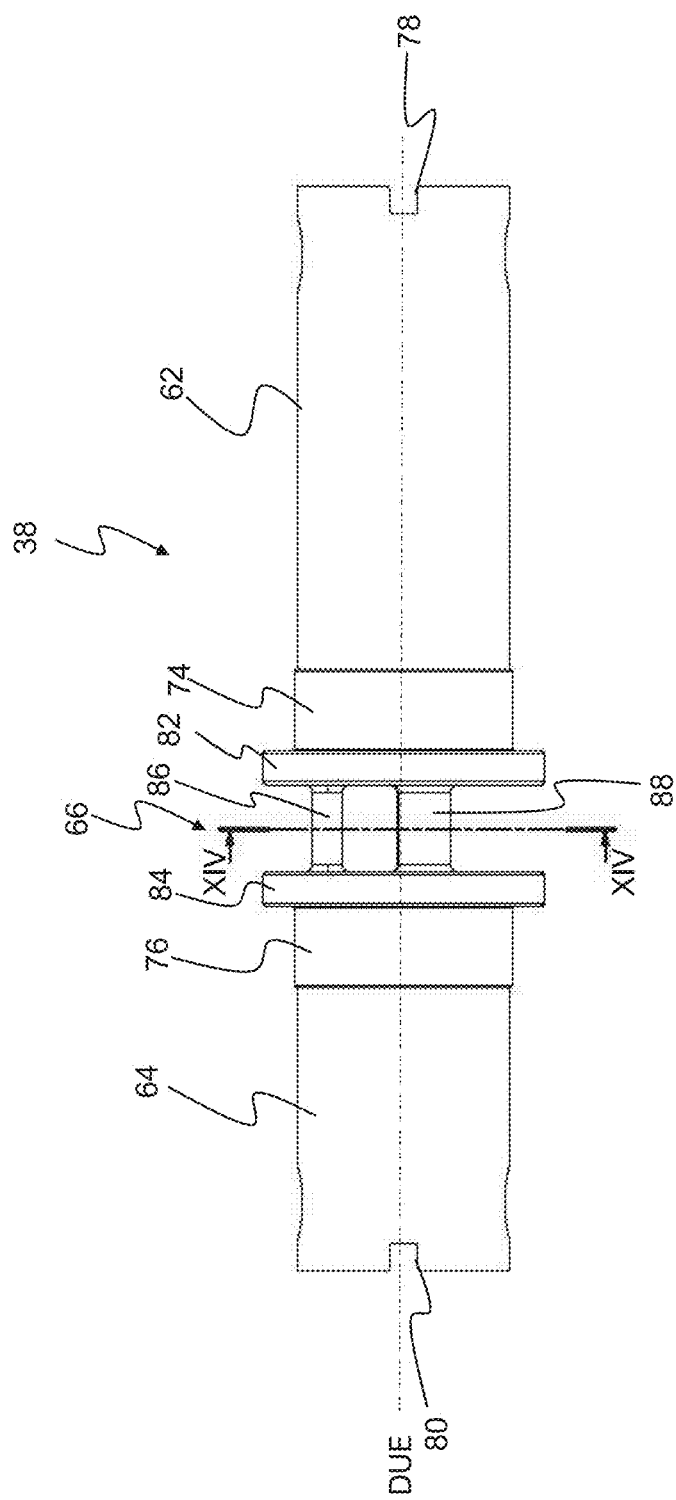
FIGS. 12 and 13 are different views of a transmission member.

FIG. 12 shows a view of the transmission member 38. The transmission member 38 comprises the two coupling portions 62 and 64 as well as the engagement portion 66 disposed in the axial direction between the coupling portions 62 and 64. The coupling portions 60 and 62 respectively have a portion 74 and 76 with an enlarged diameter. The portions 74 and 76 form a bearing section 74, 76 respectively, with which the transmission member 38 may be supported at the bearing members 36 (see FIG. 8 for example). Each coupling portion 62 and 64 has a groove 78 and 80, which extends from the end face of the respective coupling portion 62, 64 in the axial direction into the respective coupling portion 62, 64. The grooves 78 and 80 serve as lock against rotation for the sleeves 70 and 72, which are attached on the ends of the coupling portions 62 and 64 before the respective coupling portions 62, 64 are inserted into the end of the corresponding drive shaft piece 28*a* or 28*b* (see FIG. 10). The sleeves 70 and 72 may have protrusions at their radial inwardly protruding collars (see FIG. 10), which engage into the grooves 78 and 80 to prevent the sleeves 70 and 72 from rotating.

The engagement portion 66 is limited by two abutment elements 82 and 84. The abutment elements 82 and 84 may be supported by the bearing members 36 in the axial direction. The abutment elements 82 and 84 have the largest diameter of the transmission member 38. The abutment elements 82 and 84 form a guide for the drive arch 18 (see FIG. 10). The drive arch 18 extends between the two abutment elements 82 and 84 or between the side surfaces of the abutment elements 82 and 84 (see FIG. 10) opposing each other.

The engagement portion 66 has a drive member 86 and a holding member 88. The drive member 86 is, in relation to the rotational axis DUE, disposed at a distance to the holding member 88 in the radial direction. The drive member 86 is configured to engage into one of the drive recesses 40 of the drive arch 18. The holding member 88 is configured to engage into a retaining recess 42 of the drive arch 18.

Figure 13:
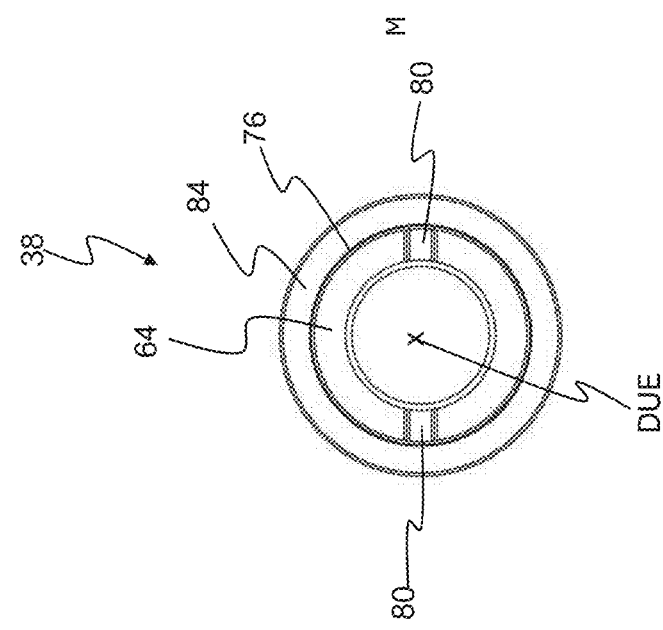

FIG. 13 shows a view of the front end of the coupling portion 64 of the transmission member 38. The coupling portion 64 is tubular. Starting from the end face of the coupling portion 64, the grooves 80 extend into the coupling portion 64 in the axial direction. With its larger diameter, the abutment element 84 forms the end of the coupling portion 64. In the same way, this is also true for the coupling portion 62 shown in FIG. 12.

Figure 14:
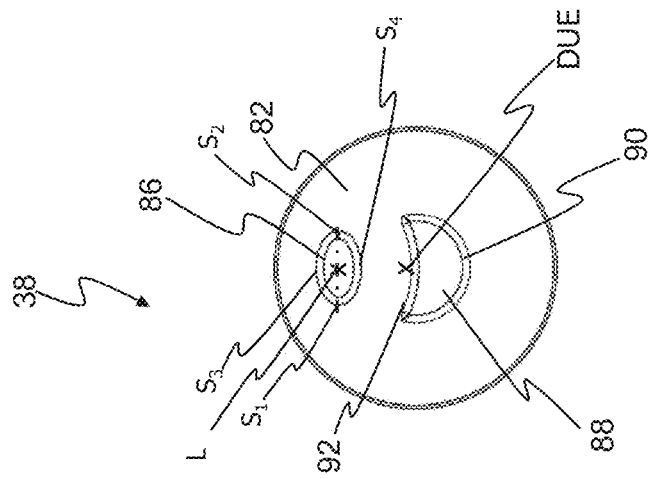
FIG. 14 is a sectional view along section line XIV-XIV in FIG. 12.

FIG. 14 shows a sectional view along section line XIV-XIV in FIG. 12. Regarding the rotational axis DUE, the drive member 86 is spaced in the radial direction of the holding member 88. Thus, there is a radial clearance between the drive member 86 and the holding member 88. The rotational axis DUE extends to the holding member 88 with a radial distance. Thus, unlike the holding member 88, the drive member 86 is disposed eccentrically.

The drive member 86 is cylindrical (see FIGS. 12 and 14). The drive member 86 comprises a cross section that deviates from a circular cross section and, at least in sections, exhibits a curved cross section. With respect to its longitudinal axis L, the cross section of the drive member 86 is reduced in the radial direction compared with a circular cross section. The cross section of the drive member 86 can be described as oval, lenticular, or elliptical. Due to the cross section of the drive member 86 being reduced in the radial direction, the engagement of the drive member 86 into one of the drive recesses 40 may be ensured, so that the function of the drive of the pivoting unit 16 may be guaranteed continuously. As labeled in FIG. 14, the cross section of the drive member 86 has four apexes $S_1$, $S_2$, $S_3$ and $S_4$. Between the apexes $S_1$ and $S_2$, the drive member 86 has its largest extension in one direction transverse to the radial direction, meaning in the tangential direction. In other words, the distance between the apexes $S_1$ and $S_2$ defines the largest extension of the drive member 86. The apexes $S_3$ and $S_4$ are in an alignment in the radial direction. The distance between the apexes $S_3$ and $S_4$ is smaller than the distance between the apexes $S_1$ and $S_2$. Due to the smaller distance between the apexes $S_3$ and $S_4$ in the radial direction of an alignment, it becomes clear that the cross section of the drive member 86 is reduced in the radial direction. The longitudinal axis L of the drive member 86 extends parallel, but offset in the radial direction, to the rotational axis DUE of the transmission member 38.

The holding member 88 has an outer contour 90 in the form of a circular arc. The surface 92 of the holding member 88 facing the drive member 86 is curved. The surface 92 may be curved concavely. The cross section of the holding member 88 shown in the embodiment of FIG. 14 may be described as crescent-shaped. The rotational axis DUE may extend through the center point of the outer contour 90 of the holding member 88, which is shaped like a circular arc. Due to the concave curvature of the surface 92, the rotational axis DUE does not extend through the cross section of the holding member 88 but along the surface 92.

Figure 15A:
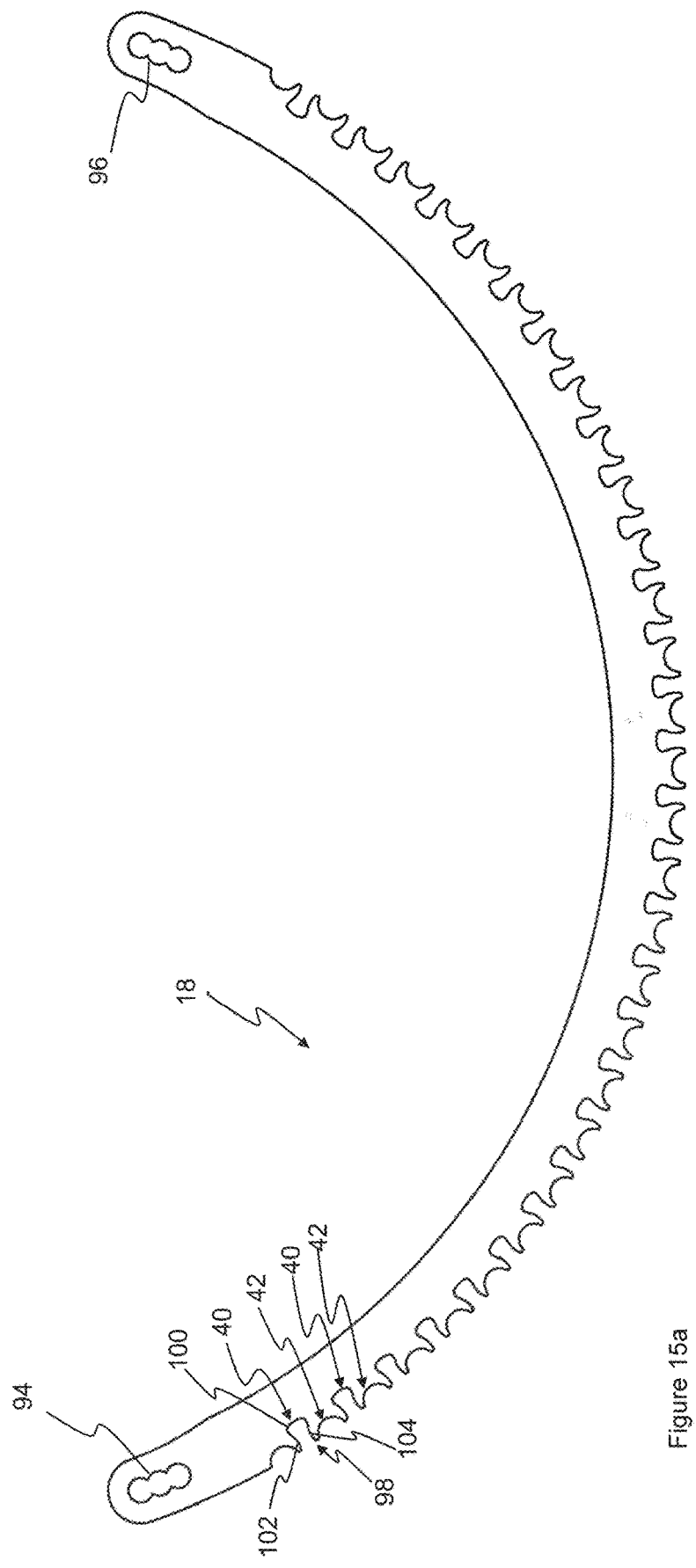
FIGS. 15a and 15b are views of a drive arch.
Figure 15B:
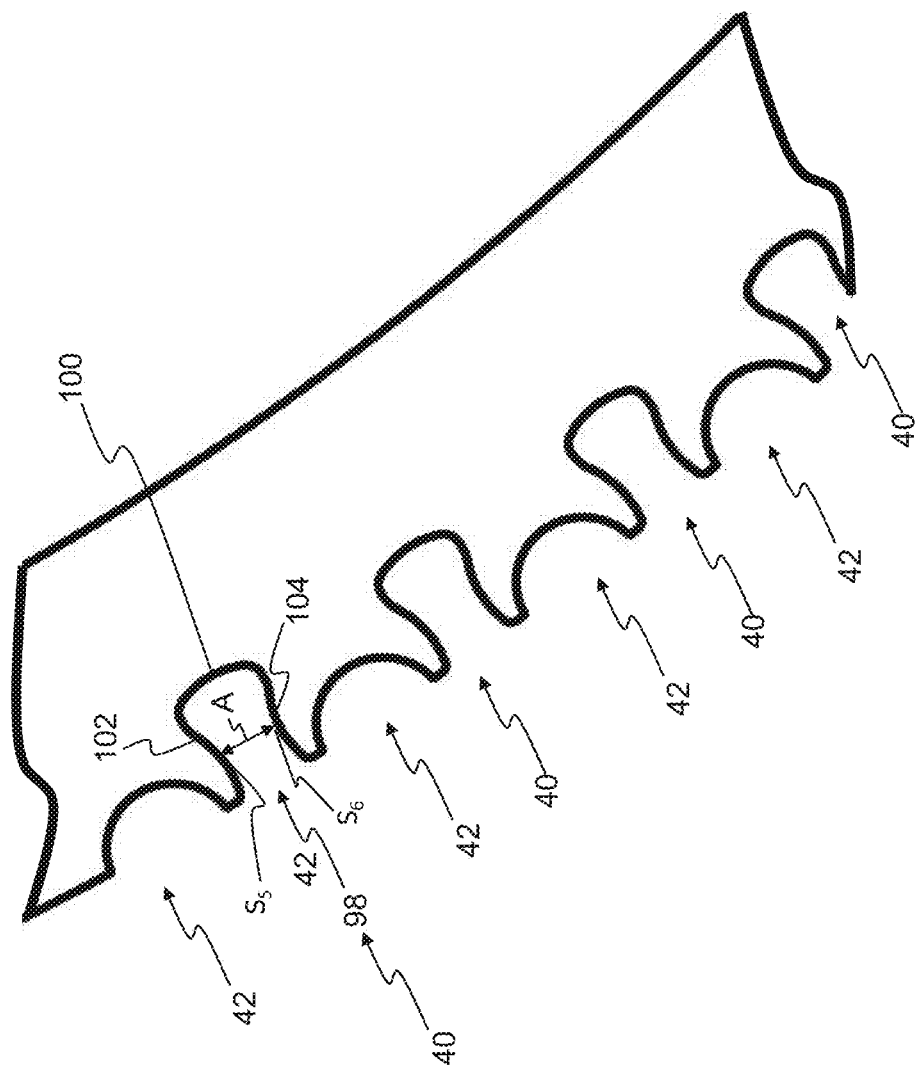

FIGS. 15*a* and 15*b* show views of the drive arch 18. The drive arch 18 has fastening apertures 94 and 96 with which the drive arch 18 may be attached to the cross member 20 (FIG. 3). The fastening apertures 94 and 96 are configured such that the drive arch 18 may be attached to the cross member 20 in different positions. The fastening apertures 94 and 96 are shaped like an elongated hole and consist of three partial openings. Each of the partial openings defines a position in which the drive arch 18 may be attached to the cross member 20. Due to the fastening apertures 94 and 96 being configured in such a way, assembly tolerances may be compensated for.

The drive arch 18 further comprises the drive recesses 40 and the retaining recesses 42. The drive recesses 40 and the retaining recesses 42 are circumferentially disposed in an alternating way of the drive arch 18. The drive recesses 40 and the retaining recesses 42 are provided at the outer periphery of the drive arch 18.

FIG. 15*b* shows an enlarged view of the section in FIG. 15*a*. The drive recesses 40 extend further into the drive arch 18 in the radial direction than the retaining recesses 42. The drive recesses 40 change their cross section in the radial direction. Starting from the entry opening 98, the cross section of the drive recess 40 initially narrows. In the direction of the radial end area or the bottom 100, the cross section of the drive recess 40 extends again.

The drive recesses 40 have opposing wall portions 102 and 104. The wall portions 102 and 104 are curved. Due to the curvature of the wall portions 102 and 104, the cross section of the drive recess 40 is reduced in the middle area as seen in the radial direction. Accordingly, the wall portions 102 and 104 have an apex $S_5$ and $S_6$, respectively. Starting from the entry opening 98, the two opposing wall portions 102 and 104 of the drive recess 40 reduce their distance A to each other until their respective apex $S_5$ and $S_6$. At the apexes $S_5$ and $S_6$, the two wall portions 102 and 104 have the smallest distance A to each other. Starting from the apexes $S_5$ and $S_6$, distance A of the two opposing wall portions 102 and 104 increases again in the direction of the radial end area or the bottom 100 of the drive recess 40. The drive recesses 40 are thus configured with an undercut. The curvature of the two opposing wall portions 102 and 104 is a convex curvature.

Below, the function of the pivoting unit 10 of FIGS. 16a to 18b is explained. FIGS. 16a, 17a and 18a show the drive arch 18 and the transmission member 38. In each of the three FIGS. 16a, 17a and 18a, the transmission member 38 has a different rotational position. Due to the rotational movement of the transmission member 38, the drive arch 18 is moved to the "left" in FIGS. 16a, 17a and 18a. The different positions of the grooves 80 show the changing rotational position of the transmission member 38. FIGS. 16b, 17b and 18b show the sections labeled respectively in FIGS. 16a, 17a and 18a in an enlarged way.

FIGS. 16a and 16b show a state of the drive arch 18 and of the transmission member 38, in which the holding member 88 of the transmission member 38 engages with a retaining recess 42 of the drive arch 18. Due to the holding member 88 engaging with the retaining recess 42, the set position of the drive arch 18 is secured or the drive arch 18 is locked in the set position, meaning that it is kept in the blocked position. Thus, the pivoting units 16 may even be kept in the pivoting position set in the case of relatively strong external influences, such as strong winds, without having to transmit significant torques to the drive system.

In FIGS. 17a and 17b, the transmission member 38 has been powered further. The rotational position of the holding member 88 has been changed in the retaining recess 42. The drive member 86 is located at the entry opening 96 of the drive recess 40 configured to the right of the retaining recess 42 shown in FIG. 17b. In this rotational position of the holding member 88 of the transmission member 38, the drive arch 18 is not yet able to be moved, since the holding member 88 is still flat in contact with the wall of the retaining recess 42.

In FIGS. 18a and 18b, the drive member 86 engages at a wall portion 102 of the drive recess 40 and further moves the drive arch 18 through the contact with the drive arch 18. This may also be recognizable from the fact that the holding member 88 is not in plane contact with the retaining recess 42 anymore but is only in contact with the retaining recess 42 at one location.

The drive unit 26, the drive shaft 28 and the at least one transmission member 38 may be coupled with each other in a torque-transmitting manner at a single axial coupling point KS1. Thus, a simple and compact design of the drive of the tracking device 10 may be achieved. Moreover, due to the axial coupling point KS1, little time is needed to connect and disconnect the individual components during assembly or maintenance work. In addition, due to the drive recesses 40 and the retaining recesses 42 at the drive arch 18, which interact with the transmission member 38, the functionality of the drive of the tracking device 10 may be guaranteed permanently.

Figure 19:
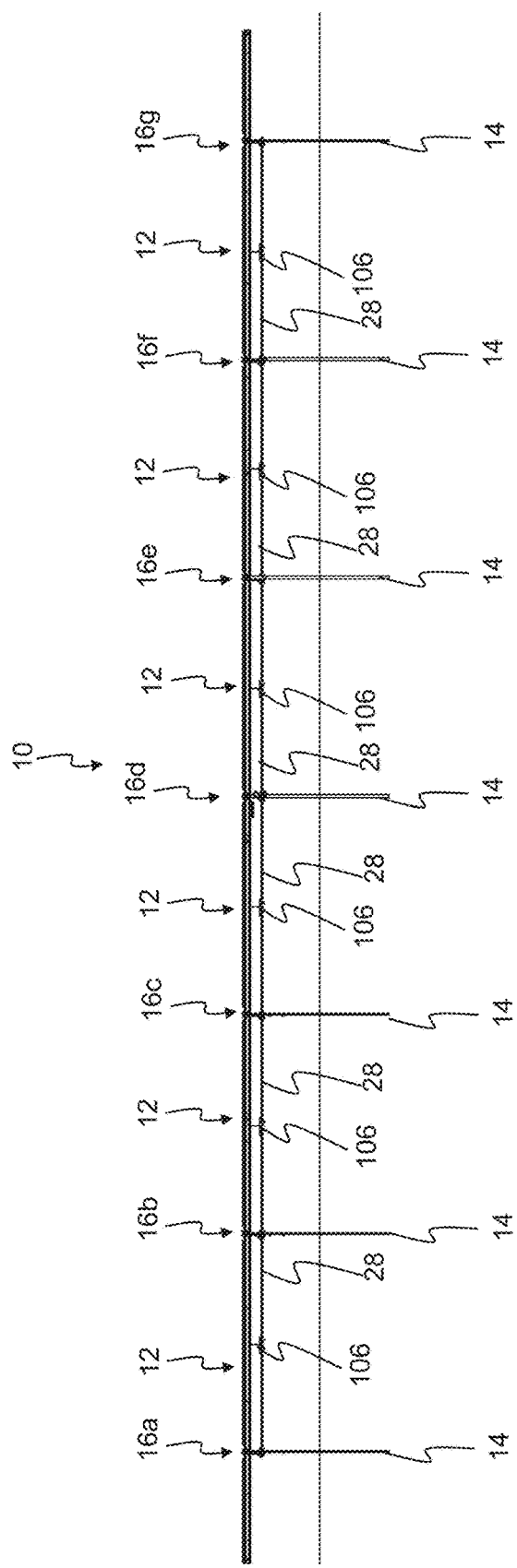

FIG. 19 shows a view of a tracking device 10. The tracking device 10 comprises several posts 14 and several pivoting units 16a to 16g. A pivoting unit 16a to 16g is attached to the post 14, respectively. The pivoting units 16a to 16g are connected with each other in a torque-transmitting manner via the drive shafts 28.

The tracking device 10 has suspensions 106 for the drive shafts 28. Each suspension 106 is assigned to a drive shaft 28. The suspensions 106 support the drive shafts 28. For this purpose, the suspensions 106 are disposed in particular in a central area of the drive shafts 28.

Figure 20:
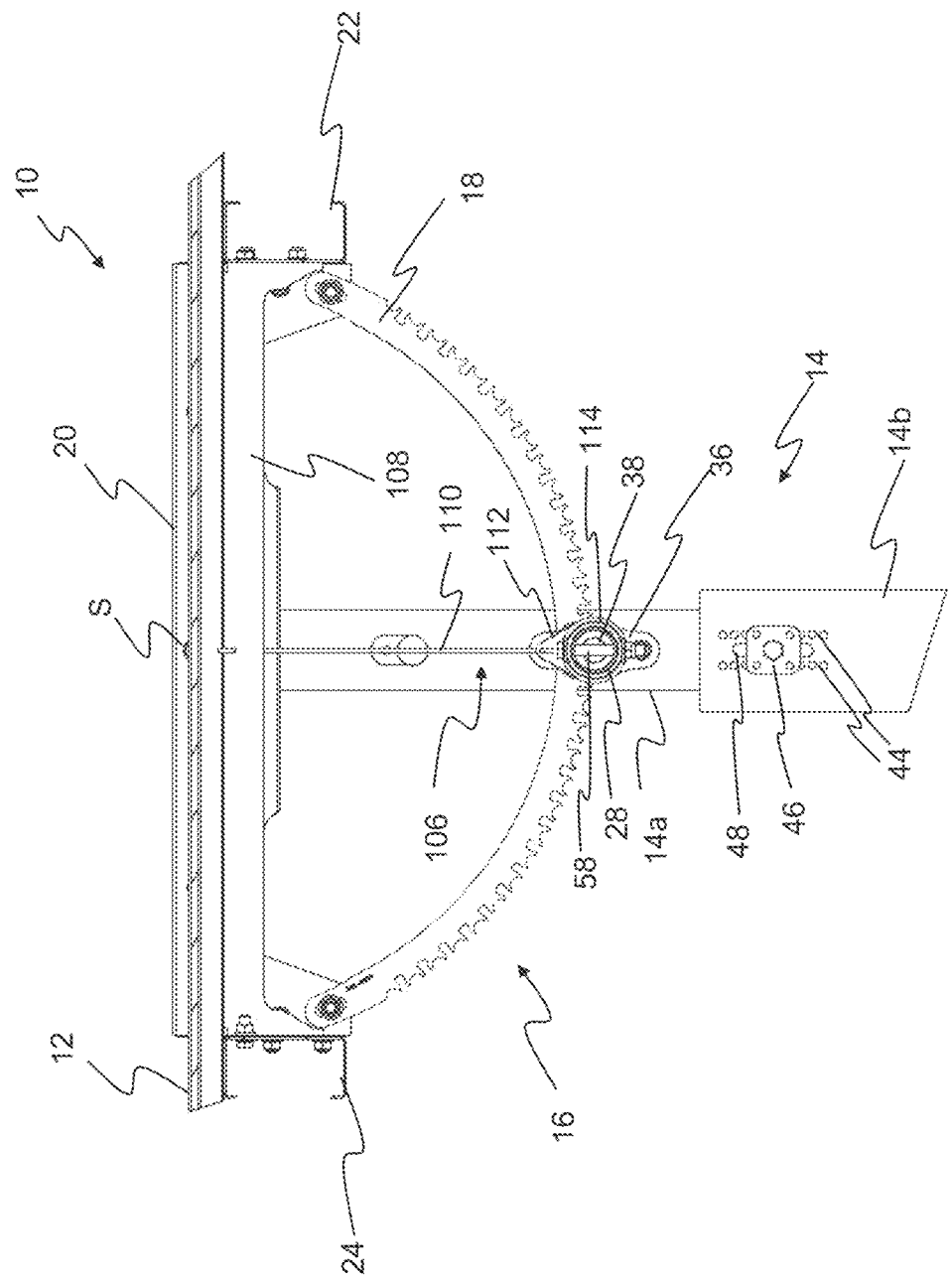

FIG. 20 shows a further view of a tracking device 10. FIG. 20 shows the suspension 106. The suspension 106 is attached to a cross member element 108. The cross member element 108 is connected to the support rails 22 and 24. The suspension 106 has a connecting member 110 and a support member 112 that supports the drive shaft 28. The connecting member 110 connects the cross member element 108 with the support member 112. The connecting member 110 thus also fastens the suspension 106 to the cross member element 108. The support member 112 has a receptacle opening 114 through which the drive shaft 28 extends.

Figure 21:
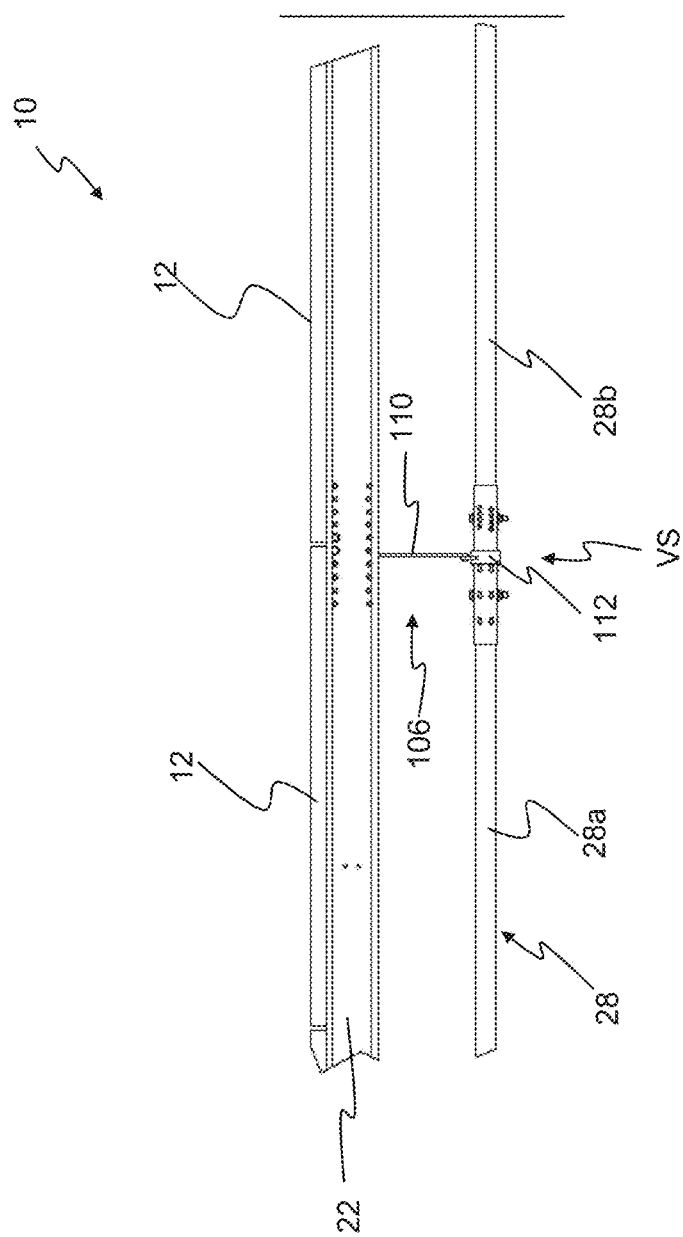
FIGS. 21 to 23 are a further view of the tracking device with the suspension.

FIG. 21 shows a further view of the tracking device 10 with the suspension 106. The drive shaft 28 comprises drive shaft pieces 28a and 28b. The drive shaft pieces 28a and 28b are connected with each other at a connecting point VS. The suspension 106 is also disposed at this connecting point VS, meaning that the suspension 106 is, like connecting point VS, located in a central area of the drive shaft 28a formed by the drive shaft pieces 28a and 28b.

Figure 23:
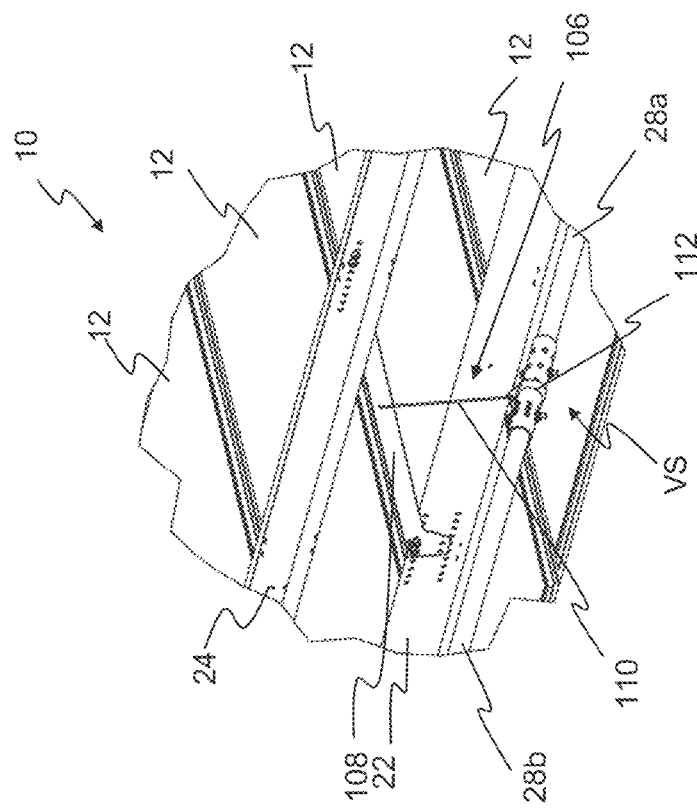
Figure 22:
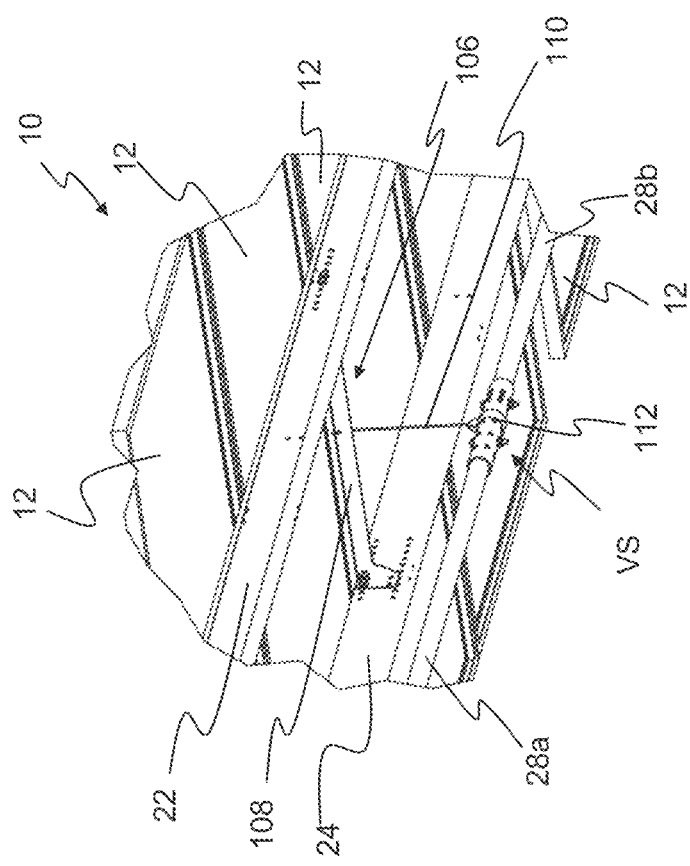

FIGS. 22 and 23 show perspective views of the tracking device 10. The suspension 106 is attached to the cross member element 108 and supports the drive shaft pieces 28a and 28b at the connecting point VS. The suspension 106 hangs down from the cross member element 108. The suspension 106 comprises the connecting member 110 and the support member 112. The connecting member 110 may be a bar, a wire, a cord, or a cable. The connecting member 110 extends between the cross member element 108 and the support member 112. The suspension 106 may prevent that the drive shaft pieces 28a and 28b "sag" in their central area or at their connecting point VS. Thus, the suspension 106 may also prevent angular misalignments at the coupling points KS1 and KS2 (see FIG. 8).

Figure 24:
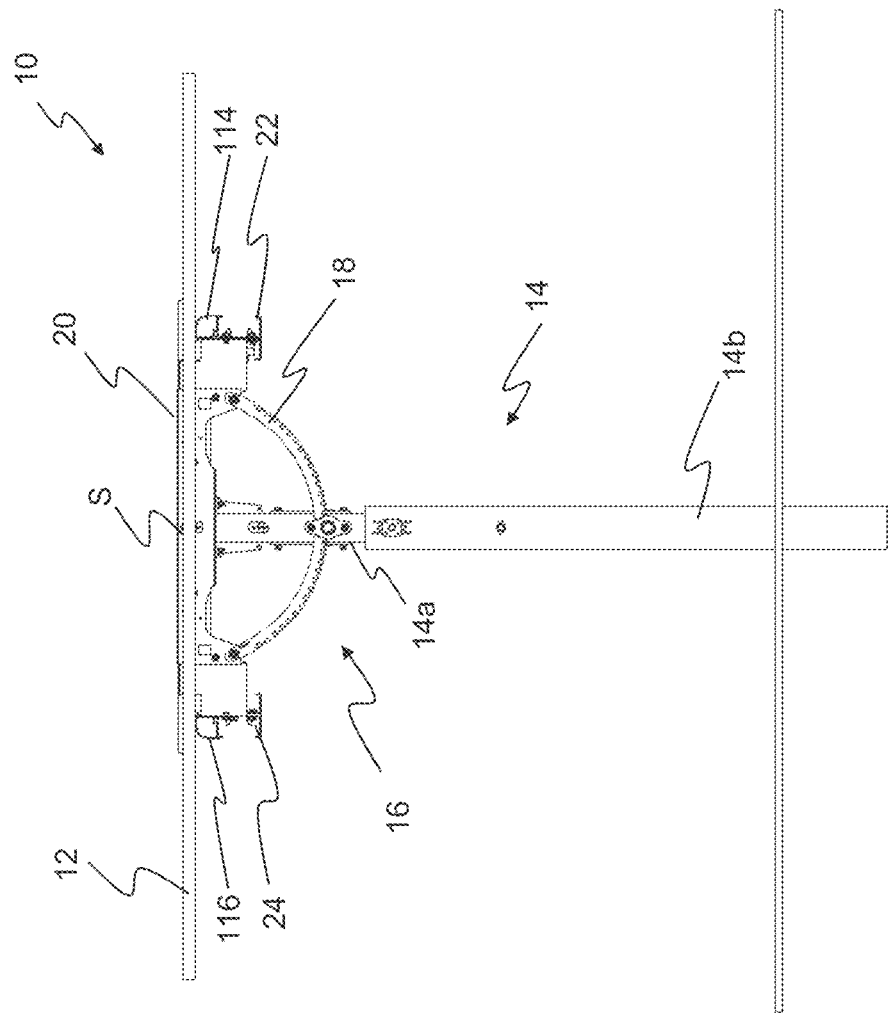
FIGS. 24 to 26 are views of a tracking device with adapter elements for bifacial solar modules.

FIG. 24 shows a view of the tracking device 10 that is configured to support bifacial solar modules 12. To be able to attach bifacial solar modules 12 at the tracking device 10 and to prevent or minimize a shading of the back side of the module by the support rails 22 and 24, adapter elements 114 and 116 are provided at the tracking device 10. The adapter elements 114 and 116 support the bifacial solar modules 12. The adapter elements 114 and 116 are disposed at the support rails 22 and 24. The adapter elements 114 and 116 lie against the top side of the support rails 22 and 24. Compared to FIGS. 4 to 6, the support rails 22 and 24 are moved downwards at the cross member 20 in this embodiment.

Figure 25:
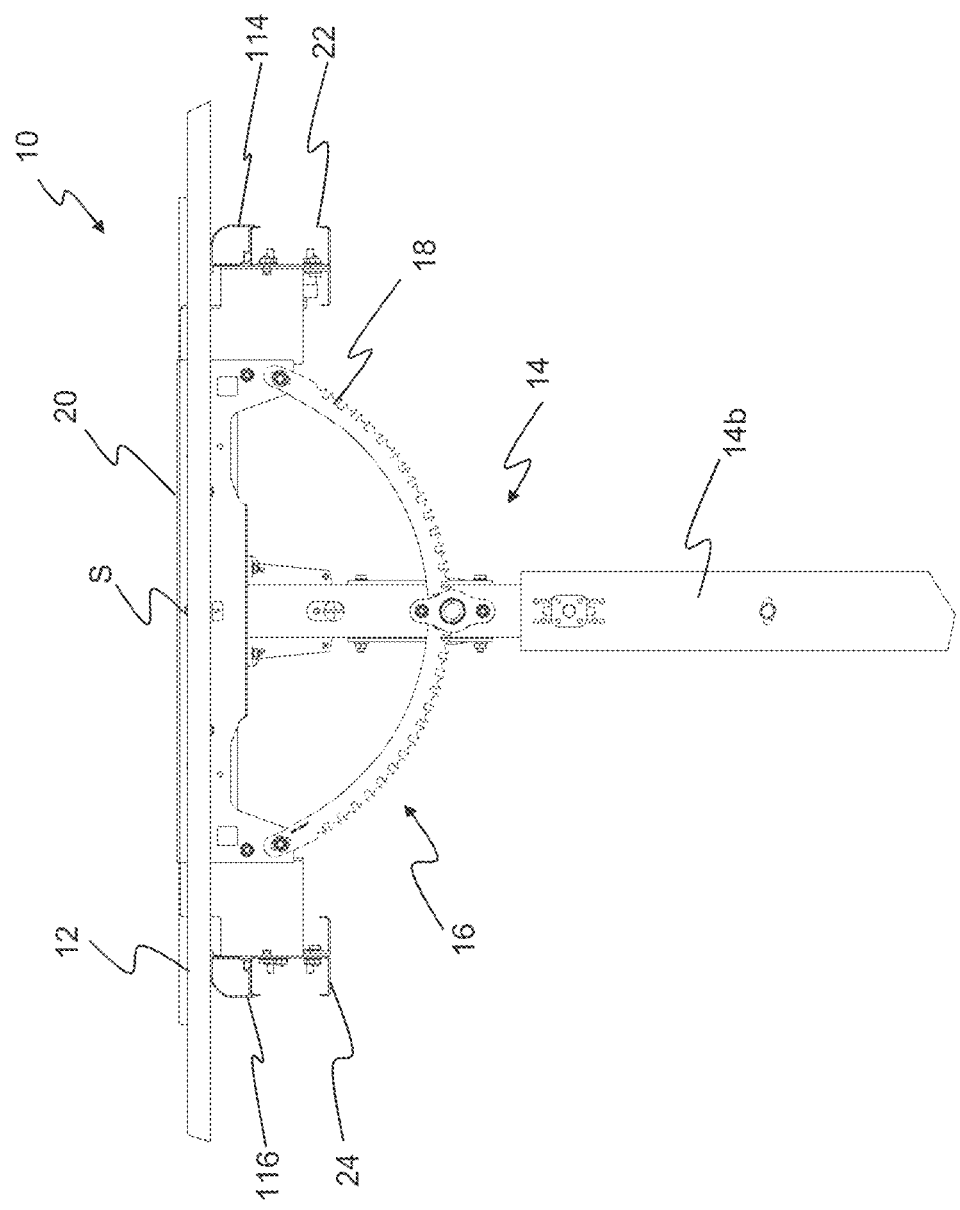

FIG. 25 shows an enlarged view of the section in FIG. 24. The adapter elements 114 and 116 are hollow sections. The adapter elements 114 and 116 lie against the top side of the support rails 22 and 24 with their bottom side. The adapter elements 114 and 116 support the bifacial solar modules 12 with their top side. The cross member 20 protrudes the upper edge of the bifacial solar module 12 in the vertical direction.

This means that the cross member 20 and thus the pivoting unit 16 are disposed between two adjacent bifacial solar modules 12. In such an arrangement, the center of gravity coincides with the pivot axis or the associated location of a pivot.

Figure 26:
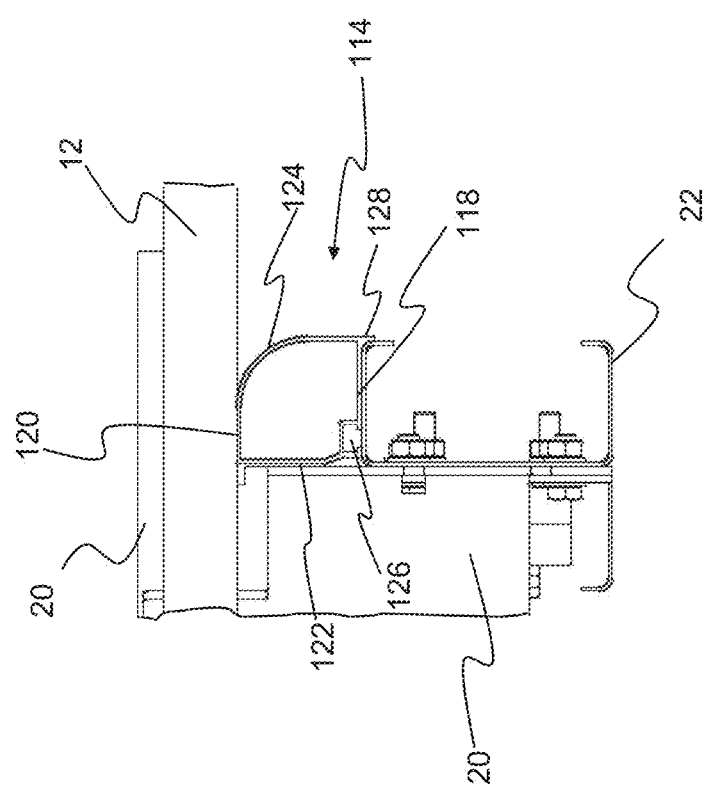

FIG. 26 shows a view of an enlarged section in FIG. 25, in which the adapter element 114 and its attachment position are shown in particular. The adapter element 114 comprises a bearing portion 118 to provide bearing on the support rail 22 and a support portion 120 to support the bifacial solar modules 12. The bearing portion 118 and the support portion 120 are connected with each other via two connecting portions 122 and 124. The adapter element 114 lies against the top side of the support rail 22 with the bearing portion 118. The bearing portion 118 comprises a receptacle channel 126 that receives a fastening member not shown in FIG. 26. The support portion 120 substantially extends parallel to the bearing portion 118. Further, the support portion 122 substantially extends orthogonal to the connecting portion 120. The support portion 122 and the bearing portion 118 are connected with each other via the connecting portion 124, which extends partially in a curved manner. A positioning protrusion 128, which positions the adapter element 114 at the support rail 22, is configured at the transition between the connecting portion 124 and the bearing portion 118. The adapter elements 114 and 116 form spacers to minimize the shading at the back side of the bifacial solar modules 12.

What is claimed is:

1. A drive arrangement, comprising:
    at least one transmission member rotatable about a rotational axis, comprising at least a drive member and at least a holding member, wherein the at least one drive member is disposed with an offset in the radial direction to the at least one holding member, and
    at least one output unit, wherein the at least one output unit comprises at least a drive recess and at least a retaining recess,
    wherein the at least one drive member is assigned to the at least one drive recess and wherein the at least one drive member is configured to engage with the at least one drive recess to drive the output unit,
    wherein the at least one holding member is assigned to the at least one retaining recess and wherein the at least one holding member is configured to engage with the at least one retaining recess to keep the output unit in its set position,
    wherein the at least one drive recess has an entry opening, an end area and a middle area that is configured between the entry opening and the end area, and wherein the at least one drive recess in the middle area compared to the end area has a reduced cross section,
    wherein the at least one drive recess has opposing wall portions that have a curvature, wherein the wall portions reduce the cross section of the at least one drive recess in the middle area due to their curvature, wherein the curvature of the opposing wall portions has an apex respectively, and wherein the opposing wall portions have the smallest distance to each other at the apexes.

2. The drive arrangement of claim 1, wherein the cross section of the at least one drive recess is larger at the entry opening than at the middle area.

3. The drive arrangement of claim 1, wherein the distance between the opposing wall portions reduces, starting from the entry opening up to the apexes.

4. The drive arrangement of claim 1, wherein the distance between the opposing wall portions increases, starting from the apexes in the direction of the end area of the at least one drive recess.

5. The drive arrangement of claim 1, wherein the at least one drive member has a longitudinal axis, wherein the at least one drive member has a cross section that is, at least in sections, curved, which deviates from a circular cross section, wherein the longitudinal axis extends at least substantially parallel to the rotational axis.

6. The drive arrangement of claim 1, wherein the cross section of the at least one drive member has at least a first apex and at least a second apex, wherein their distance to each other defines the largest extension of the drive member or wherein the cross section of the at least one drive member has at least a first edge and at least a second edge, wherein their distance to each other defines the largest extension of the drive member.

7. The drive arrangement of claim 6, wherein the cross section of the at least one drive member has at least a third apex and a fourth apex, wherein their distance to each other is smaller than the distance between the first apex or the first edge and the second apex or the second edge.

8. The drive arrangement of claim 1, wherein the at least one drive recess widens in the direction of the entry opening.

9. The drive arrangement of claim 1, wherein the rotational axis of the at least one transmission member extends along the at least one holding member.

10. The drive arrangement of claim 1, wherein the at least one holding member has an outer contour with a curvature, which is adjusted to the curvature of the at least one retaining recess.

11. The drive arrangement of claim 1, wherein the at least one holding member has at least a curved surface facing the at least one drive member.

12. The drive arrangement of claim 1, wherein the at least one drive member and the at least one holding member are connected with each other via at least one abutment portion.

13. The drive arrangement of claim 1, wherein the at least one drive member has an oval or elliptical or lenticular or circular cross section.

14. The drive arrangement of claim 1, wherein the at least one output unit is a unit that is rotatable or pivotable about an axis.

15. The drive arrangement of claim 1, wherein the at least one output unit is a linear displaceable unit.

16. A drive arrangement, comprising:
    a transmission member rotatable about a rotational axis, wherein the transmission member comprises a drive member and a holding member, wherein the drive member is disposed with an offset in a radial direction to the holding member, and
    an output unit, wherein the output unit comprises a drive recess and a retaining recess,
    wherein the drive member is configured to engage with the drive recess to drive the output unit,
    wherein the holding member is configured to engage with the retaining recess to keep the output unit in its set position,
    wherein the drive recess has an entry opening, an end area, and a middle area that is configured between the entry opening and the end area, and wherein the drive recess in the intermediate area compared to the end area has a reduced cross section, wherein the at least one drive recess has opposing wall portions that have a curvature, wherein the wall portions reduce the cross section of the at least one drive recess in the middle area due to their curvature, wherein the curvature of the opposing wall portions has an apex respectively, and wherein the opposing wall portions have the smallest distance to each other at the apexes.

* * * * *